Feb. 24, 1959    K. A. OPLINGER    2,874,806
ELEVATOR CONTROL SYSTEM
Filed Feb. 13, 1958    8 Sheets-Sheet 1

WITNESSES:
Bernard R. Giegue
Leon J. Faza

INVENTOR
Kirk A. Oplinger
BY C. L. Freedman
ATTORNEY

Feb. 24, 1959  K. A. OPLINGER  2,874,806
ELEVATOR CONTROL SYSTEM
Filed Feb. 13, 1958
8 Sheets-Sheet 4
Fig. 4A.
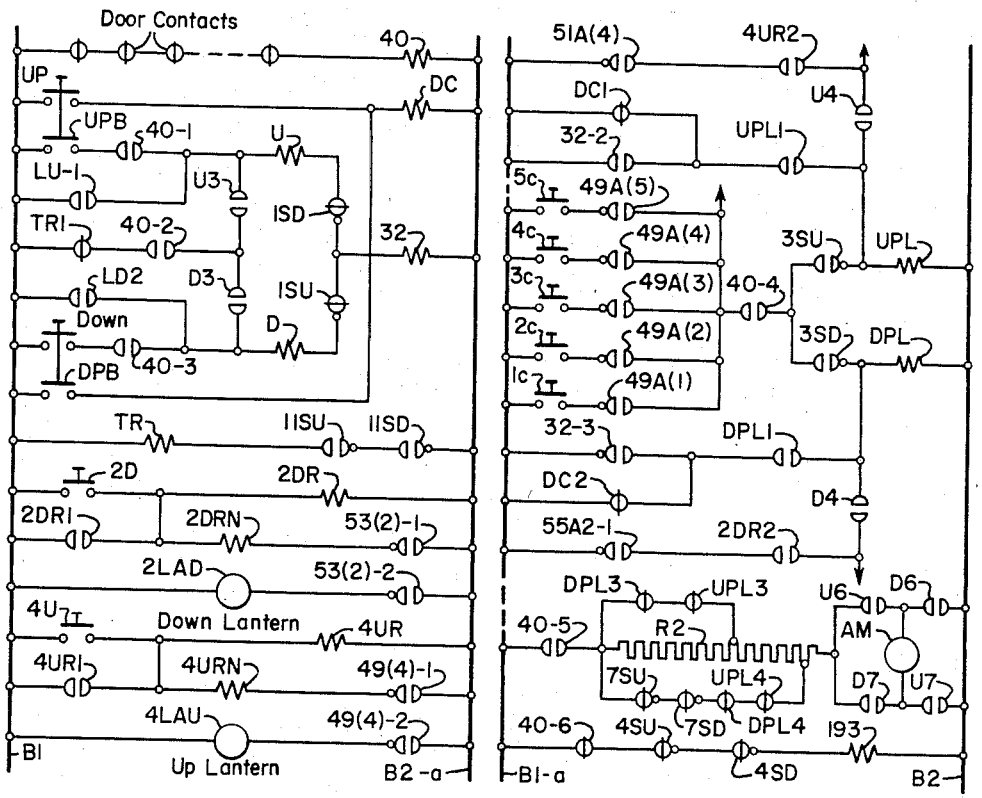
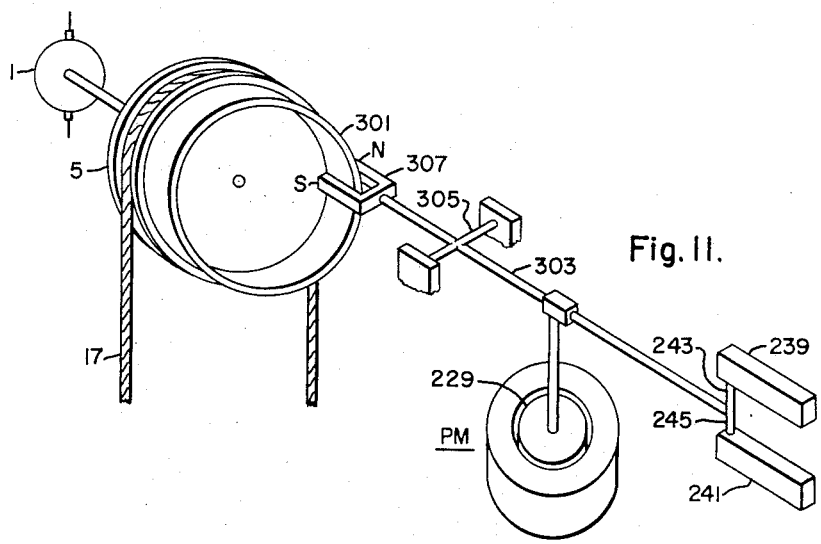
Fig. 11.

Feb. 24, 1959     K. A. OPLINGER     2,874,806
ELEVATOR CONTROL SYSTEM
Filed Feb. 13, 1958     8 Sheets-Sheet 5

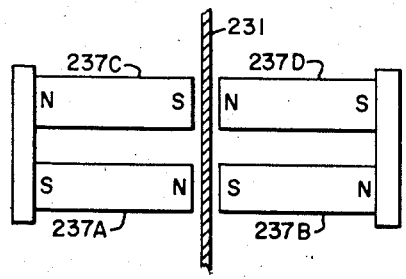
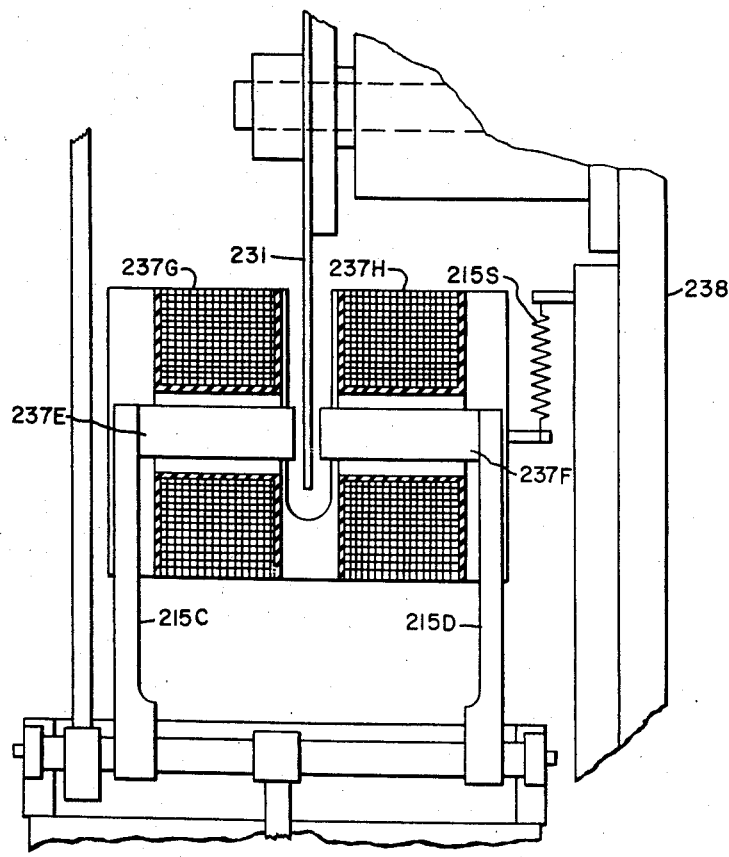
Fig. 9A.
Fig. 10.

United States Patent Office 2,874,806
Patented Feb. 24, 1959

2,874,806

ELEVATOR CONTROL SYSTEM

Kirk A. Oplinger, Penn Township, Allegheny County, Pa., assignor to Westinghouse Electric Corporation, East Pittsburgh, Pa., a corporation of Pennsylvania Application February 13, 1958, Serial No. 715,068

23 Claims. (Cl. 187—29)

This invention relates to motor-control systems, and it has particular relation to mechanisms and systems for controlling the starting and stopping of elevator cars.

Although the invention may be employed in whole or in part with various types of motor-control systems, it is particularly suitable for elevator systems wherein an elevator car stops automatically in response to calls for service. The calls for service may be registered by means of car-call buttons positioned within the elevator car or by means of floor buttons operated by waiting passengers at the various floors served by the elevator car. The elevator system may be of the automatic type wherein an elevator car starts automatically in response to registration of a call for service. However, the invention also is suitable for an attendant-operated elevator system wherein an attendant in the elevator car must perform some function in order to permit the elevator car to start for the purpose of answering a call for service.

In an elevator system embodying the invention, the speed and position of an elevator car are controlled by comparing the actual speed and position of the elevator car with a reference pattern. A variation between the actual speed and that called for by the pattern results in an adjustment for correcting the actual speed of the elevator car.

The actual speed of the elevator car is determined by the control of an element or device which is movable with respect to a supporting structure. The element is electromagnetically coupled to the elevator motor for the purpose of applying a force acting between the element and the supporting structure which is dependent on the speed of the elevator car. A second force in opposition to the first force is applied between the element and the supporting structure to serve as a reference or pattern representing the desired motor speed. In a preferred embodiment of the invention, this second force is produced by a second electric or pattern motor which is energized in accordance with the desired elevator speed and position.

The resultant movement of the element controls the energization of the elevator motor. Thus, the elevator motor may be of the direct-current type and may have its armature coupled to the armature of a direct-current generator to form a variable voltage or Ward Leonard control system. The resultant movement of the element is utilized to control the field excitation of the direct-current generator.

In a preferred embodiment of the invention, the element adjusts in opposite directions a pair of rheostats or variable resistors. The generator field is excited in accordance with the difference in the effective resistances of the resistors.

The energization of the pattern motor is controlled for the purpose of controlling the acceleration, slowdown and position of the elevator. The control of at least the slow-down and position of the elevator preferably is a continuously-variable control. Thus, a magnetic plate is provided for each floor served by the elevator car, and is positioned adjacent the path of travel of an electromagnetic unit carried by the elevator car. A control circuit including the electromagnetic unit has an output which varies in magnitude with the displacement of an elevator car from a floor at which the elevator car is to be stopped and has a directional property dependent on the direction of such displacement.

It is therefore an object of this invention to provide an elevator system having an elevator motor electromagnetically coupled to a motor-control element for applying a first force acting between the control element and a supporting structure together with means for applying to the control element a predetermined force acting in opposition to the first force.

It is a further object of the invention to provide an elevator system as defined in the preceding paragraph which includes means for applying to the control element a third force responsive to the rate of change of energization of the elevator motor and acting in opposition to the second force.

It is also an object of the invention to provide an elevator system as set forth in each of the preceding two paragraphs which includes means for continuously varying the second force as a function of the displacement of the elevator car from a floor to which it is to be stopped.

It is another object of the invention to provide an elevator system having an elevator motor, a control mechanism comprising a control element movable in the dependence on, but slower than, the elevator travel in a first zone for continuously modifying the elevator speed and a control element movable directly with the elevator travel in a second zone for continuously varying the elevator speed.

It is an additional object of the invention to provide a control unit for a moving body having pattern means for developing a controlling force and means electromagnetically coupling the pattern means to the moving body to develop a force acting in opposition to the controlling force.

It is a still further object of the invention to provide a control unit for a movable body wherein a control element, which is movable relative to a structure, is electromagnetically coupled to an operating member which applies a first force to the control element, and wherein a motor device applies a second force to the control element acting in opposition to the first force.

Other objects of the invention will be apparent from the following description taken in conjunction with the accompanying drawings, in which:

Figs. 4 and 4A are schematic views with circuits shown in straight line form showing control circuits suitable for the elevator system of Fig. 1;

Fig. 9A is another view of this control unit.

Fig. 10 is a detailed view in side elevation illustrating a modified form of the control unit of Fig. 8; and Fig. 11 is a view in perspective with parts broken away illlustrating an elevator system embodying a modified form of the invention.

GENERAL SYSTEM

Figure 1:
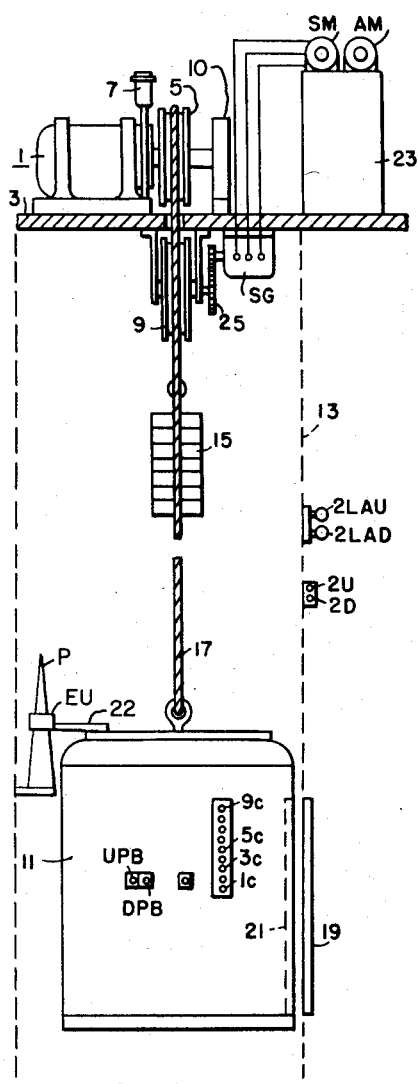
Figure 1 is a schematic view with parts shown in elevation and parts shown in cross section of an elevator system embodying the invention.

Although the invention may be employed in elevator systems for various types of operation, it will be assumed that the system of Fig. 1 is designed for what is known as "signal operation." Referring to Fig. 1, an elevator motor 1 is secured to the upper surface of a floor 3 which may be located in the penthouse of a building being served by the elevator system. The elevator motor 1 has a traction sheave 5 secured to its shaft, and an elevator brake 7 is associated with the elevator motor and the traction sheave in a conventional manner. As will be pointed out below, the elevator brake is spring applied to hold the traction sheave 5 stationary and is released in response to energization of a solenoid. A secondary or idler sheave 9 is secured to the lower surface of the penthouse floor 3. A control unit 10 is operated by the shaft of the motor 1. This control unit is employed in controlling the speed of the motor 1 and will be discussed below.

An elevator car 11 is mounted for movement in a hoistway 13 to serve the various floors of the building associated therewith. The elevator car is connected to a counterweight 15 by means of one or more ropes or cables 17 which pass around the traction sheave 5 and the secondary sheave 9 in a conventional manner.

At each floor served by the elevator car, a hoistway or floor door 19 is provided. In addition, the elevator car has a gate 21 which registers with the hoistway door at any floor at which the elevator car is stopped. The doors and the gate may be of conventional construction and may be operated automatically in any conventional way. However, for present purposes, it will be assumed that the gate and doors are opened and closed by an elevator car attendant.

In order to register calls for floors desired by passengers traveling in the elevator car, a plurality of car call buttons 1c to 9c are provided. It is assumed that the building served by the elevator car has nine floors requiring service. The elevator car also contains an up push button UPB and a down push button DPB which are operated by the car attendant in order to condition the elevator car for up travel or down travel.

As illustrated in Fig. 1, an up push button 2U is provided at the second floor for operation by a person desiring transportation in an up direction. A similar push button would be provided at each of the floors from which a person may desire to travel in an up direction. Hereinafter each such push button will be identified by the reference character U preceded by a number corresponding to the floor at which the button is located. In a similar manner, Fig. 1 shows a down push button 2D which may be operated by a person desiring to travel in a down direction. A similar push button would be located at each floor from which a person may desire transportation in a down direction.

In order to signal the approach and direction of an elevator car to an attending passenger, suitable floor signals such as lanterns may be provided. Thus, in Fig. 1, an up floor lantern 2LAU and a down floor lantern 2LAD are illustrated. Similar lanterns may be provided at each floor requiring such signals.

As the elevator car approaches a floor at which it is to stop, it is desired that the elevator car stop automatically and accurately in registration with the desired floor. To this end, position-responsive mechanism is provided in the hoistway and on the elevator car. Thus, Fig. 1 shows an electromagnetic unit EU mounted on a bracket 22 which is secured to the elevator car. An inductor plate P constructed of magnetic material is located in the hoistway for each of the floors served by the elevator car. When the elevator car is accurately stopped at a floor, the unit EU is associated with the plate P for such floor in the manner illustrated in Fig. 1.

To facilitate leveling of the elevator car the unit EU has an electrical output, the magnitude of which is dependent on the displacement of the elevator car from registry with a landing or floor at which the elevator car is to be stopped. The output also has a directional characteristic dependent on the direction of the displacement of the elevator car from the floor.

Figure 5:
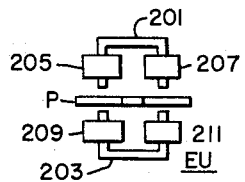
Fig. 5 is a view in top plan of a leveling unit suitable for the system of Fig. 1.
Figure 6:
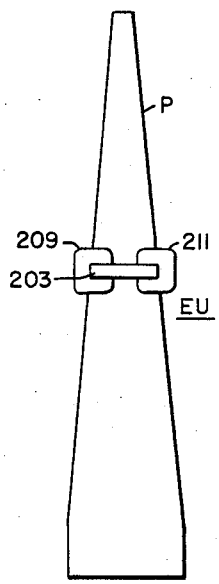
Fig. 6 is a view in side elevation of the leveling unit shown in Fig. 5.

The construction of the unit EU is shown more clearly in Figs. 5 and 6. The unit includes a pair of soft magnetic cores 201 and 203 which are C-shaped and which have pole faces adjacent each other to define a rectangular magnetic path. It will be noted that the pole faces of the cores are spaced to provide air gaps through which the plate P may pass.

The core 201 is provided with primary windings 205 and 207 which are connected to direct magnetic flux in the same direction around the associated magnetic path. The magnetic core 203 has secondary windings 209 and 211 which have voltages induced therein by fluxes passing through the associated magnetic path.

It will be noted that when the plate P is located between the magnetic cores it tends to shield the secondary windings from magnetic flux produced by the primary windings. The extent of the shielding depends on the position of the plate with respect to the magnetic cores. By inspection of Fig. 6 it will be noted that the plate has a tapering configuration. Maximum shielding is obtained when the magnetic cores are adjacent the lower end of the plate illustrated in Fig. 6. The shielding decreases as the magnetic cores approach the upper end of the plate. The application of the unit EU will be discussed further in connection with Figs. 4 and 4A below.

Further control of the operation of the elevator car is provided by a floor selector 23 (Fig. 1) which conveniently may be mounted on the penthouse floor 3. This floor selector has two drive inputs supplied thereto. One is a drive input by an advance motor AM located on the top of the floor selector. A second drive input is supplied for the purpose of driving the floor selector in accordance with movement of the elevator car. Such a drive input may be provided in any desired manner. For example, a drive tape may be provided in a known manner for mechanically driving the selector unit in accordance with movement of the elevator car. However, in Fig. 1, a preferred drive is provided of the self-synchronous type. Such a drive includes a transmitter or generator SG which is electrically connected to a receiver or motor SM. The transmitter or generator SG is coupled to the secondary sheave 9 through suitable gearing 25.

The floor selector 23 may be of any suitable type. Conveniently, it may be similar to the floor selector illustrated in the Savage Patent 2,657,765 and such a floor selector is here illustrated in Figs. 2 and 3.

Figure 2:
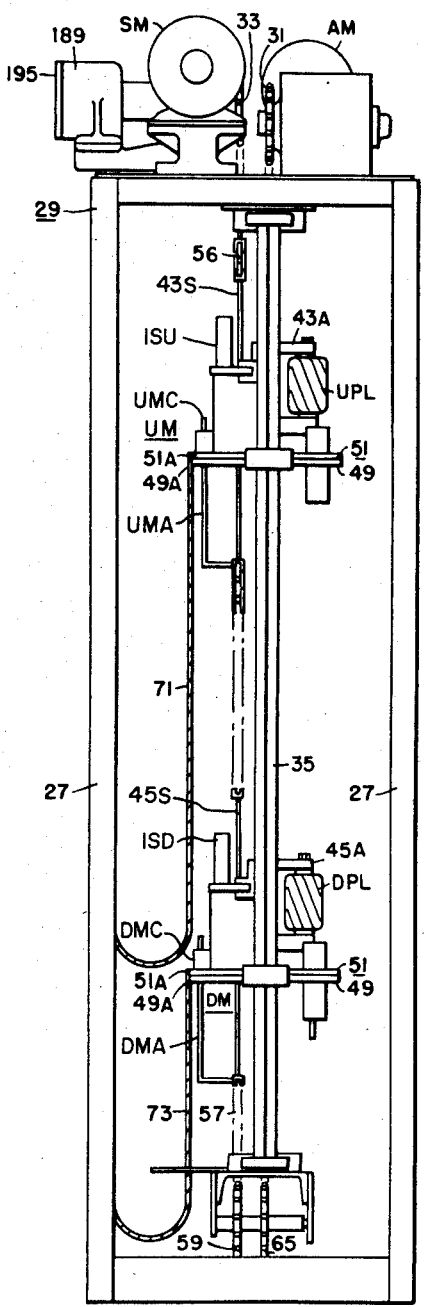
Fig. 2 is a view in side elevation of a floor selector suitable for the system of Fig. 1.
Figure 3:
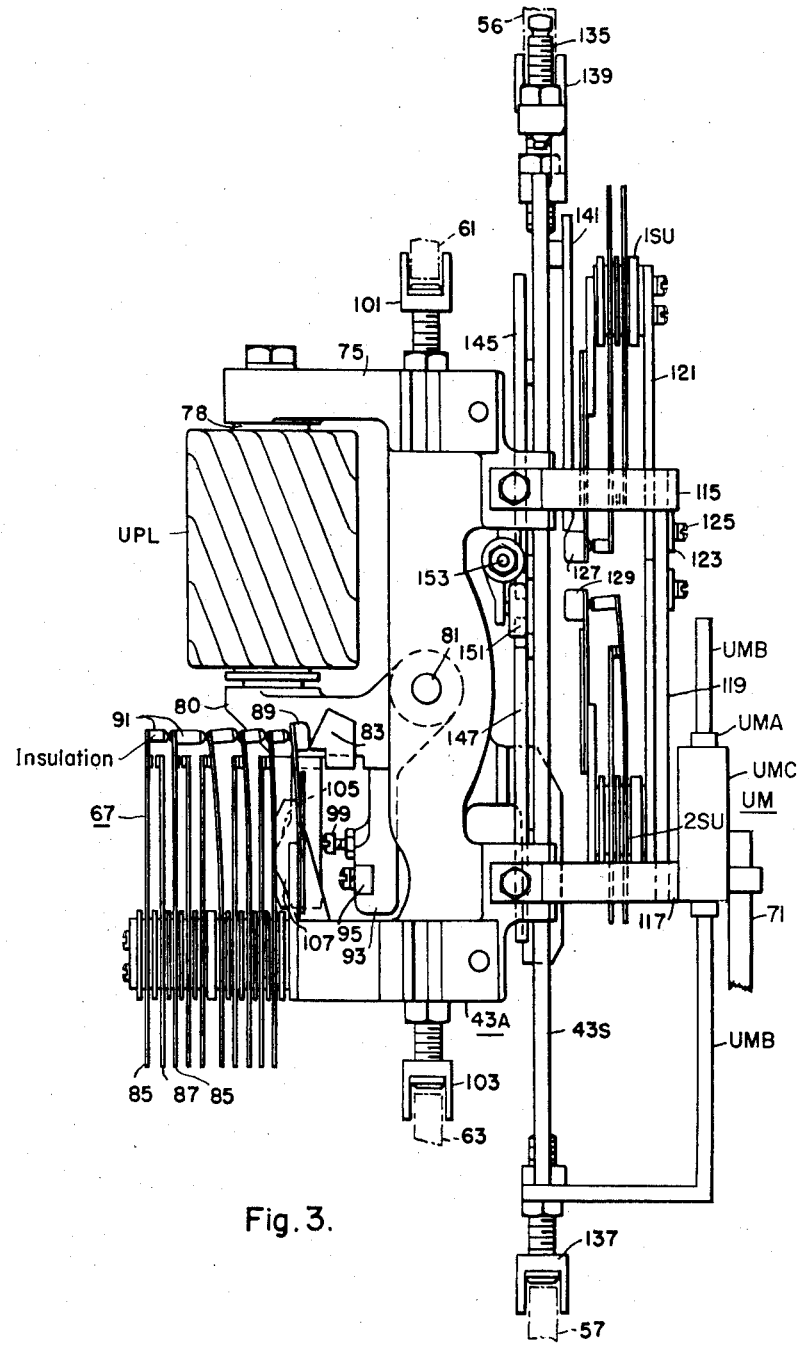
Fig. 3 is a view in side elevation of a carriage unit suitable for the floor selector of Fig. 2.

Figs. 2 and 3 are based respectively on Figs. 2 and 5 of the aforesaid Savage patent. The floor selector of the present Figs. 2 and 3 may be similar to the floor selector of the aforesaid Savage patent except for the adjustment of certain of the switches and except for the addition of solenoid control units thereto. To facilitate consideration of the selector, the following components of Figs. 2 and 3 are listed which are identical with components bearing the same reference characters in the aforesaid Savage patent:

| | |
|---|---|
| AM | Advance motor. |
| SM | Motor of self-synchronous drive. |
| 29 | Supporting structure |
| 35 | Guide rail. |
| 43, 45 | Carriage units. |
| 49, 51, 49A, 51A | Pile-up switches of floor-stop units. |
| 43S, 45S | Synchronous carriages. |
| 43A, 45A | Advance carriages. |
| 56, 57 | Chains. |
| UPL | Up pawl relay. |
| 1SD, 1SU, 67, 2SU | Pile-up switches. |
| DPL | Down pawl relay. |
| 71, 73 | Flexible cables. |
| 31, 33, 59, 65 | Sprocket wheels. |

For a complete understanding of the floor selector, reference may be made to the aforesaid Savage patent. As will be pointed out more particularly below, certain of the switches of the Savage selector are here given different adjustments. In addition, the present selector includes two solenoid control units UM and DM which are employed for controlling acceleration and deceleration of the elevator car. The solenoid control unit UM includes a coil UMC which is mounted on the advance carriage 43A and a magnetic armature UMA which is mounted on the synchronous carriage 43S of the selector. Consequently, relative movement of the advance and synchronous carriages results in movement of the armature relative to the coil UMC for the purpose of varying the impedance thereof. In a similar manner the solenoid control unit DM includes a coil DMC which is mounted on the advance carriage 45A and a soft magnetic armature DMA is mounted on the synchronous carriage 45S. Relative movement of the carriages 45A and 45S results in variations in the impedance of the unit DM.

The solenoid control unit UM is shown in greater detail in Fig. 3. It will be noted that the soft magnetic armature UMA is positioned within the coil UMC when the elevator car is positioned accurately at a floor to provide maximum impedance of the coil. The armature UMA is secured to the synchronous carriage 43S by means of a bracket UMB which is constructed of a non-magnetic and non-conductive material, such as a phenolic resin. The armature and coil may be configured to provide any desired pattern of variation of impedance of the coil in response to relative movement of the coil and its armature. For present purposes it will be assumed that the impedance of the coil varies in a linear manner with such relative motion.

ELEVATOR CONTROL SYSTEM

As previously pointed out, the floor selector described above may be employed with various types of elevator systems. In order to illustrate the application of the floor selector to a suitable elevator system, reference will be made to the circuits shown in Figs. 4 and 4A. In these circuits, a number of electromagnetic relays and switches are illustrated. These relays and switches may have contacts of the make type which close when the relay or switch is energized or picked up, and which are opened when the relay is deenergized or dropped out. Alternatively, the relay or switch may have break contacts which open when the relay or switch is energized or picked up and which are closed when the relay or switch is deenergized or dropped out. The relays and switches will be designated by a suitable reference character, and each set of contacts will be designated by an appropriate suffix in the form of a numeral. For example, the expression U1 designates the first set of contacts for the up switch U, whereas the expression U3 designates the third set of contacts for the up switch U.

In order to facilitate consideration of the control system, a number of the coils, relays and switches referred to are listed below as follows:

| | |
|---|---|
| 40 | Door relay. |
| U | Up switch. |
| D | Down switch. |
| 32 | Car-running relay. |
| UPL | Up pawl relay. |
| DPL | Down pawl relay. |
| DC | Door closing relay. |
| 2DR etc | Down floor call registering relays. |
| 2DRN etc | Down floor call canceling coils. |
| 1UR etc | Up floor call registering relays. |
| 1URN etc | Up floor call canceling coils. |
| TR | Transfer relay. |

Figure 4:
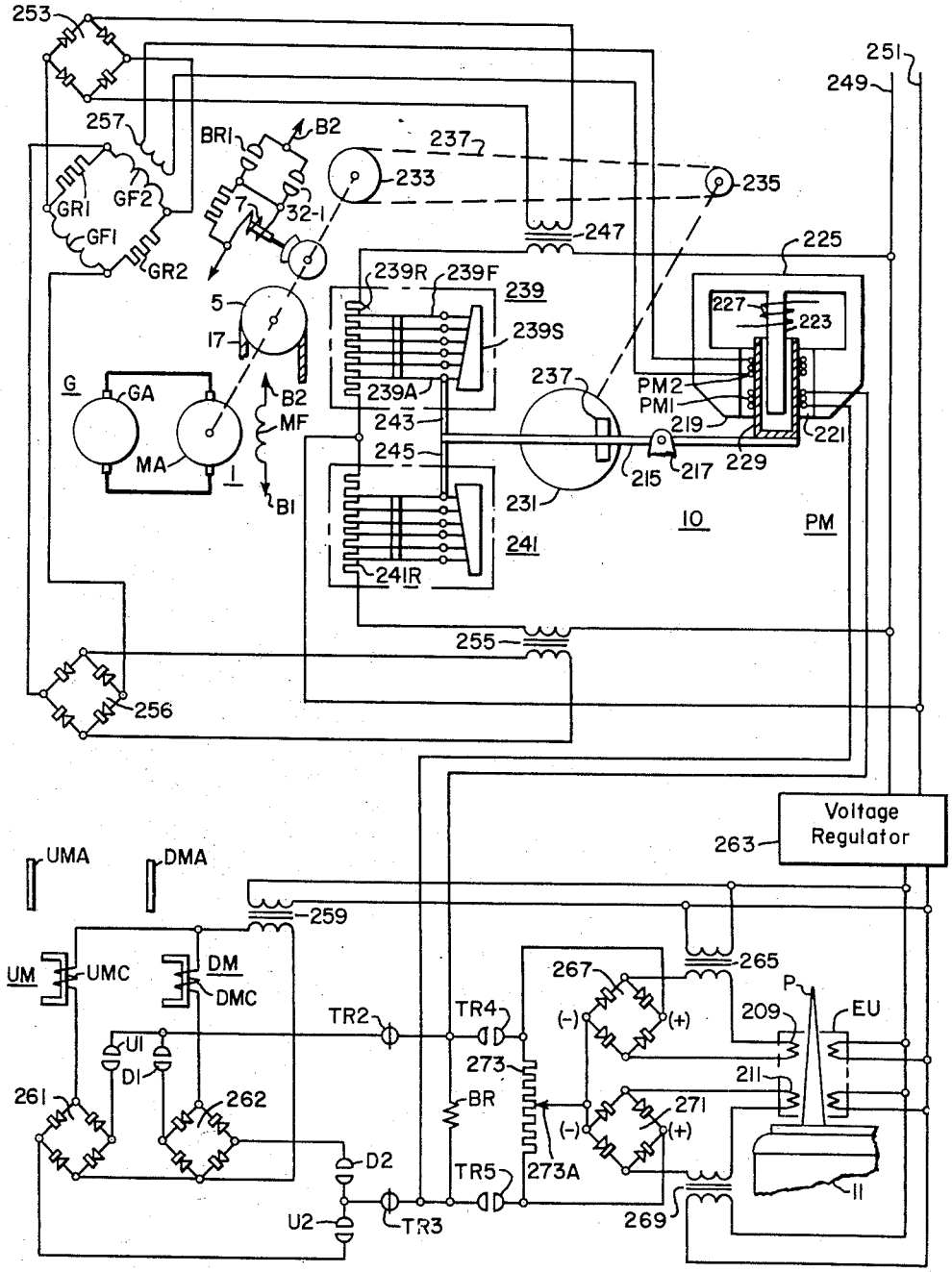

Referring to Figs. 4 and 4A, the elevator motor 1 is of the direct-current type and has a field winding MF connected across direct-current buses B1 and B2 for energization therefrom. The control system illustrated is of the variable-voltage type and includes a generator G having an armature GA connected in a loop with the armature MA of the motor 1. The generator has two field windings GF1 and GF2 which are connected with two resistors GR1 and GR2 in a bridge for energization in a manner to be discussed below.

A door relay 40 is provided which is energized by door contacts only when the elevator car gate and all of the hoistway doors are closed. Such relays are commonly employed in elevator systems.

The direction of travel of the elevator car is determined by the operation of the up push button UPB or the down push button DPB by the attendant in the elevator car. Operation of one of these buttons energizes a door closing relay DC and under suitable conditions completes an energizing circuit for a car running relay 32 and either an up switch U or a down switch D. The switches U and D determine the direction of travel of the elevator car.

Although the doors may be operated manually, it will be assumed that energization of the door closing relay DC initiates a closing operation of the car gate and the hoistway door for the floor at which the elevator car is stopped. Such door operators are well-known in the art.

A transfer relay TR is connected across the direct-current buses B1 and B2–a through switches 11SU and 11SD of the floor selector. (Certain extensions of the direct-current buses B1 and B2 are labeled B1–a and B2–a.) These switches are operated by relative movement between the advance and synchronous carriages of the floor selector, and both of the switches are closed only if the elevator car is within a predetermined distance of a floor at which it is to stop, such as twenty inches.

During up travel of the elevator car, a stopping operation of the elevator car is initiated by energization of the up pawl relay UPL. Similarly, during down travel of the elevator car, the stopping operation is initiated by energization of the down pawl relay DPL. These relays are prepared for energization by actuation of a car pull push button 1c to 9c. Only five car call push buttons are illustrated in Fig. 4A, but it will be understood that a similar car call push button would be provided for each of the floors served by the elevator car. The car call push buttons are of the type which when actuated by the car attendant remain actuated until the elevator car reverses its direction of travel. Although the resetting of the push buttons may be automatically performed, it will be assumed that they are reset manually by the car attendant after the completion of each trip in one direction.

The up and down pawl relays also are prepared for energization by operation of floor push buttons. Thus, for the second floor, a push button 2D may be actuated to energize a floor call registering relay 2DR for the second floor. When energized the call registering relay closes make contacts 2DR1 to establish a holding circuit around the push button 2D. When the call for service is answered, a call canceling coil 2DRN is energized through suitable floor selector contacts 53(2)-1 to reset the call registering relay 2DR. In accordance with conventional practice, the call canceling coil and the coil of the relay 2DR may be mounted on the same core and may be energized to develop opposing magnetomotive forces in order to reset the relay 2DR when the coil 2DRN is energized. The equipment for the second floor also includes a down lantern 2LAD which is energized through suitable floor selector contacts 53(2)-2 when the elevator car is to stop at the second floor during a down trip. Although these circuits are shown only for the second floor, it will be understood that a similar set of circuits would be required for each of the floors at which the elevator car may stop during down travel. Ordinarily, such circuits would not be required at the lower terminal floor.

In a somewhat similar manner, each of the floors requiring the stopping of the elevator car during an up trip is provided with a push button and associated circuits. These are shown in Fig. 4A only for the fourth floor. Thus, if a person at the fourth floor desires to travel up, he may operate the push button 4U to energize up call registering relay 4UR. This relay closes its make contact 4UR1 to establish a holding circuit around the push button 4U. In addition, a call canceling coil 4URN is provided which may operate in the manner discussed for the down canceling coil 2DRN. The up lantern 4LAU may be operated from floor selector contacts 49(4)-2 when the elevator car is to stop during an up trip is to stop at the fourth floor. Contacts 2DR2 of the down call registering relay 2DR and contacts 4UR2 of the up call registering relay 4UR are illustrated for controlling respectively the energizations of the down pawl relay DPL and of the up pawl relay UPL. It will be understood that a similar circuit for energizing each of the pawl relays would be provided for each of the floors requiring the appropriate stopping of the elevator car thereat.

The direction of rotation of the advance motor depends on the direction of travel of the elevator car. Consequently, the direction of rotation of the advance motor is determined by a reversing switch device which includes contacts of the up switch U and the down switch D. Under certain conditions, it is desirable to reduce the energization of the advance motor. Such reduction is effected by means of a resistor R2 which has taps controlled by the pawl relays DPL and UPL and by other switches on the floor selector. It will be assumed for present purposes that the advance motor has a field provided by one or more permanent magnets.

A coil 193 for releasing the sprocket wheel 33 also is illustrated in Fig. 4. This coil is described in the aforesaid Savage Patent 2,657,765.

Figure 7:
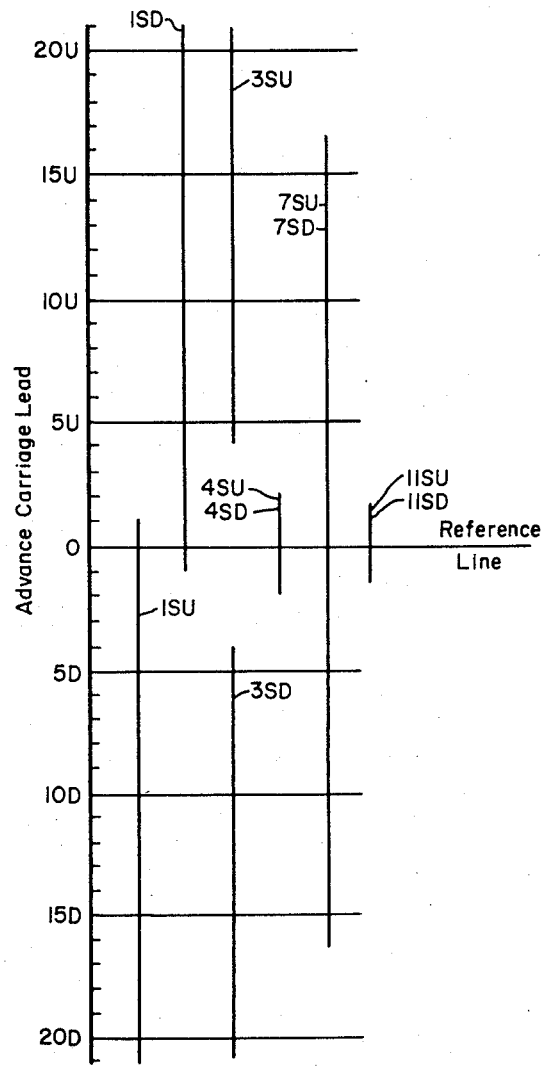
Fig. 7 is a diagrammatic view showing conditions of electrical switches in the system of Fig. 1.

It will be recalled that a number of switches 1SU, 1SD, 3SU, 3SD, 4SU, 4SD, 7SU, 7SD, 11SU, 11SD, are operated in accordance with relative movement between the advance and synchronous carriages. Suitable conditions of operation of these switches for the specific system under consideration are illustrated in Fig. 7. However, it should be understood that the lead of the advance carriage relative to the synchronous carriage and the operation of the various switches may be selected in accordance with the requirements of each elevator system. In Fig. 7, ordinates above and below the reference line indicate the lead of the advance carriage relative to the synchronous carriage respectively for up travel and down travel, as the elevator car nears a floor at which it is to stop. By inspection of Fig. 7, it will be noted that the maximum lead in either direction is of the order of 20 feet (expressed in corresponding car travel). Lines are illustrated in Fig. 7 to indicate the period during which switches have their contacts closed. For example, the switch 1SU is positioned to have its contacts closed from a position wherein the elevator car is approximately one foot above the reference line to a position wherein the carriages have their full lead or advance for travel in a downward direction. As a further example, the switch 11SU and the switch 11SD are closed when the elevator car is within approximately twenty inches from a floor at which it is to stop for either direction of travel. It is believed that the operating conditions for the other switches can be ascertained by reference to Fig. 7.

Referring next to the control unit 10, the speed of the motor is determined by the torque of a control element in the form of a lever 215 which is mounted for rotation about a pivot 217. This lever has applied thereto a pattern force or torque acting about the pivot 217 which is representative of the speed desired from the motor 1. In a preferred embodiment of the invention the force is applied by an electric pattern motor PM. This motor has a magnetic structure comprising an outer pole piece 219 having a cylindrical hole 221. A cylindrical pole piece 223 is positioned within the hole to form an annular air gap between the pole pieces. The pole pieces are connected by means of a suitable yoke 225 of magnetic material.

A magnetic field is established in the annular air gap in any suitable manner. For example, all or parts of the pole pieces and the yoke may be constructed of a permanent magnet material capable of establishing a magnetomotive force between the pole pieces.

Alternatively, the pole piece and the yoke may be constructed of a soft magnetic material and a winding 227 may be connected to a direct-current source for the purpose of establishing the desired magnetomotive force between the pole pieces.

A cup 229 has an end secured to the lever 215 and has a tubular wall portion surrounding a part of the inner pole piece 223. The cup may be constructed of aluminum or nylon. By inspection of Fig. 4 it will be noted that the tubular wall portion of the cup carries two windings PM1 and PM2. The winding PM1 may be energized from a source of direct current for applying a force or torque to the lever 215. The winding PM2 is employed to minimize hunting and will be discussed in greater detail below.

A second force or torque is applied to the lever 215 which acts in opposition to the force or torque applied to the lever by the motor PM and which is dependent on the rate of rotation of the motor 1. In the embodiment of Fig. 4 the armature MA of the motor 1 is coupled to an electroconductive armature in the form of a disc 231 to rotate the disc about its axis. Thus, the shaft of the motor 1 may carry a pulley or sprocket wheel 233 which is connected through a coupling belt or chain 237 to a pulley or sprocket wheel 235 on a shaft connected to the disc 231. In order to reduce the size of the unit, the coupling may be designed to rotate the disc 231 at a rate higher than the rate of rotation of the armature MA.

The disc 231 is positioned to rotate in a magnetic field produced by a structure mounted on the lever 215. For example, a permanent magnet 237 may be mounted on the lever for the purpose of establishing a magnetic field within which the disc 231 rotates.

Because of the electromagnetic coupling between the permanent magnet 237 and the disc 231 the rotation of the disc applies a torque to the lever 215 having a magnitude dependent on the rate of rotation of the motor armature MA and having a direction dependent on the direction of rotation of the armature MA.

Deflection of the lever 215 about its pivot 217 is utilized to control the excitation of the generator G. In a preferred embodiment of the invention, the movement of the lever controls the adjustment of a suitable transducer for adjusting the generator excitation. In a preferred embodiment the transducer includes two adjustable resistors of rheostats 239 and 241. The rheostat 239 includes the resistor 239R having a plurality of parallel adjacent leaf springs 239A to 239F connected to taps on the resistor. The leaf springs are biased against a stop 239S which is shaped to keep the springs slightly spaced from each other. The lever 215 carries a pusher arm 243 which engages the leaf spring 239A. When the lever is actuated in a clockwise direction as viewed in Fig. 4, the pusher arm 243 forces certain or all of the springs 239A to 239F into electrical engagement with each other to shunt a portion or all of the resistor. The extent of movement of the lever 215 determines the effective resistance of the resistor 239R.

The rheostat 241 is operated similarly by a pusher arm 245 mounted on the lever 215. By inspection of Fig. 4 it will be noted that movement of the lever arm operates the rheostats in opposite directions. Consequently, clockwise rotation of the lever 215 decreases the effect of resistance of the resistor 239R whereas counterclockwise rotation of the lever 215 decreases the effective resistance of the resistor 241R. Rheostats of this type are well known in the art and examples of such rheostats will be found in the Hanna et al. Patent 2,246,301, which issued June 17, 1941.

The generator G is excited in accordance with the difference between the effective resistances of the rheostats 239 and 241. To this end the resistor 239R is connected in series with the primary winding of a transformer 247 across two conductors 249 and 251 which are connected to a source of alternating current which may have a frequency of the order of 60 cycles per second. The output of the secondary winding of the transformer 247 is rectified by a full-wave rectifier 253 and the output of the rectifier is connected across a first diagonal of the bridge which includes the generator field windings GF1 and GF2. It will be assumed that the rectifiers energize the field windings with proper polarity for down travel of the elevator car.

In an analogous manner the resistor 241R and the primary winding of a transformer 255 are connected in series across the conductors 249 and 251. The output of the secondary winding of the transformer 255 is rectified by a full-wave rectifier 256 and the rectified output is applied across a second diagonal of the bridge which includes the generator field windings. It will be assumed that such excitation of the generator is in proper direction for up travel of the elevator car.

It will be recalled that the winding PM2 is energized to minimize hunting of the motor 1. To this end the winding may be inductively coupled to the generator field winding GF2 through a winding 257. Any change in excitation of the generator thus induces a voltage in the winding 257 which in turn energizes the winding PM2. The winding PM2 when energized applies a force or torque to the lever 215 acting in a direction tending to oppose the change in excitation of the generator field windings.

It will be recalled that the solenoid control units UM and DM are employed for controlling acceleration and deceleration of the elevator car. The solenoid coil UMC is connected across the secondary winding of a transformer 259 through the input terminals of a full-wave rectifier 261. The primary winding of the transformer 259 is energized from the conductors 249 and 251 through a suitable voltage regulator 263 which maintains a substantially constant alternating voltage across the primary winding of the transformer.

When the elevator car is conditioned to start in an upward direction from a floor at which it has stopped, the break contacts TR2 and TR3 of a transfer relay are closed and make contacts U1 and U2 of an up switch are closed to connect the output terminals of the rectifier 261 across the winding PM1 of the pattern motor PM. It will be assumed that the polarity of such excitation is such that the pattern motor applies a torque to the lever 215 acting in a counterclockwise direction about the pivot 217. As will be pointed out more clearly below, the armature UMA under these conditions is displaced from the coil UMC and the impedance of the unit UM is at a minimum. Consequently, substantial current is applied to the winding PM1 and the resultant torque acting on the lever 215 decreases the effective resistance of the rheostat 241. This in turn excites the generator G in the proper direction for up travel of the elevator car.

The elevator car now accelerates and as it accelerates the motor 1 rotates the disc 231 for the purpose of applying a torque to the lever 215 acting in opposition to the torque produced by the winding PM1. As the speed of the elevator car increases, the torque produced by rotation of the disc 231 increases until the desired speed of the elevator car is obtained. Any deviation of the elevator car from the desired speed is reflected by movement of the lever 215 in the proper direction to adjust the speed of the elevator car to the desired value.

When the elevator car approaches a floor at which it is to stop, the armature UMA is moved gradually towards the coil UMC to increase the impedance of the coil. Such increase in impedance of the coil results in a gradual decrease in the energization of the winding PM1, and consequently, a gradual decrease in the torque applied to the lever 215 by the pattern motor PM. This decrease in torque is reflected in movement of the lever in a direction suitable for slowing the motor 1. If desired, the slow down of the elevator car by operation of the armature UMA relative to the coil UMC may be sufficient to permit application of the brake as the elevator car reaches its position of registry within the floor at which it is to stop. However, in the interest of accuracy the electromagnetic unit EU is brought into operation during the last stage of the approach of the elevator car to the floor in order to stop the car accurately at the floor and to maintain it level with the desired floor. Thus, as the elevator car reaches the desired zone, the transfer relay opens its break contacts TR2 and TR3 to render the solenoid control unit UM ineffective and closes its make contacts TR4 and TR5 to render the electromagnetic unit EU effective for controlling the elevator car.

It will be noted that the winding 209 of the electromagnetic unit EU is connected in series with the secondary winding of a transformer 265 across the input terminals of a full-wave rectifier 267. Also, the winding 211 is connected in series with the secondary winding of a transformer 269 across the input terminals of a fullwave rectifier 271. The primary windings of the transformers 265 and 269 are connected to the output terminals of the voltage regulator 263. The output of the rectifier 267 is applied across the upper half of a resistor 273 whereas the output of the rectifier 271 is applied across the lower half of the resistor 273. The specific portion of the resistor utilized as a load for each of the rectifiers may be adjusted by means of a tap 273A on the resistor.

To illustrate the operation of the electromagnetic unit EU it will be assumed that the transformer 265 has a secondary voltage of the order of seven volts whereas the transformer 269 has a secondary voltage of the order of fourteen volts. Furthermore, it will be assumed that movement of the plate P through the electromagnetic unit EU results in induced voltages in the windings 209 and 211 which vary continuously between zero and seven volts. The polarities of the windings are such that the voltages across the winding 209 and the secondary winding of the transformer 265 are in phase with each other whereas the voltages across the winding 211 and the secondary of the transformer 269 are in phase opposition.

When the electromagnetic unit EU is midway between the ends of the plate P the outputs of the rectifiers 267 and 271 as applied to the resistor 273 are equal in magnitude and opposite in polarity. Consequently, the resultant voltage across the resistor 273 is zero. If the electromagnetic unit EU is displaced upwardly from this mid-position, the output of the rectifier 271 decreases whereas the output of the rectifier 267 increases with the polarities illustrated in Fig. 4. This means that the upper terminal of the resistor 273 is positive with respect to the lower terminal of the resistor and the magnitude of the voltage across the resistor depends on the extent of displacement on the elevator car in an upward direction. Conversely, displacement of the elevator car in the opposite direction from a position of registry with the floor applies a voltage across the resistor 273 such that the upper terminal of the resistor is negative with respect to the lower terminal. It follows that when the resistor 273 is connected across the winding PM1 of the pattern motor the excitation of the generator G is always in a proper direction to move the elevator car into registry with the floor at which it is to stop. Inasmuch as the electromagnetic unit EU is mounted directly on the elevator car whereas the plate P is mounted directly in the hoistway of the car, accurate leveling of the elevator car is assured. It will be noted that an auxiliary brake relay BR is connected across the winding PM1. The purpose of this relay is to maintain the brake released as long as the winding PM1 is energized.

If the elevator car is to move in a downward direction from a floor at which it has stopped, the make contacts D1 and D2 of a down switch are closed to connect the solenoid control unit DM through the break contacts TR2 and TR3 to the winding PM1. The operation of the unit DM will be apparent from the preceding discussion of the unit UM.

OPERATION

A. *Car moves from first floor to fourth floor*

It is believed that an understanding of the invention will be facilitated by a discussion of certain typical operating sequences for the elevator system. For the first sequence it will be assumed that the elevator car is parked at the lower terminal floor with its doors open and that a passenger desiring to proceed to the fourth floor enters the elevator car.

While the elevator car is parked at the lower terminal floor with its doors open, the transfer relay TR is energized. Also, the coil 193 is energized. It will be recalled that this coil, when energized, releases the sprocket wheel 33 (Fig. 2) to permit resetting of the synchronous carriages relative to the advance carriages. All other electromagnetic relays and switches in Figs. 4 and 4A are deenergized at this time.

When the passenger enters the elevator car, the elevator attendant operates the car push button 4c to register a car call for the fourth floor. It will be recalled that this push button remains in its operated condition until the elevator car has completed an up trip.

Next the elevator car attendant operates the up push button UPB to energize the door closing relay DC. This relay when energized initiates closure of the hoistway door for the lower terminal floor and the car gate in a conventional manner. As a result of such closures, the door relay 40 is energized. This relay closes its make contacts 40–2, 40–3, 40–4 and 40–5 to prepare certain circuits for subsequent energization. In addition, the break contacts 40–6 open to deenergize the coil 193. As a result of the deenergization of the coil 193, the sprocket wheel 33 (Fig. 2) is coupled to the motor SM.

When the door closing relay DC was energized, it opened its break contacts DC1 and DC2. Had either of the relays UPL or DPL been energized at this time, the opening of the contacts DC1 and DC2 would have deenergized them.

The operation of the up push button UPB also completes the following circuit following closure of the contacts 40–1:

B1, UPB, 40–1, U, 1SD, 32, B2–*a*

The switch 1SD is positioned to have its contacts closed from a position wherein the elevator car is approximately one foot above a stop to a position wherein the selector carriages have their full advance for travel in a downward direction.

The energization of the up switch U closes the make contacts U1 and U2 to connect the coil PM1 of the pattern motor PM to the rectifier 261, when the contacts TR2 and TR3 close, for energization in the proper direction for up travel of the elevator car. The make contacts U3 close to prepare a holding circuit for the switch U and the car running relay 32 for subsequent completion. The make contacts U4 close to prepare the up pawl relay UPL for energization as it approaches a floor for which an up floor call is registered. Finally, the make contacts U6 and U7 close to complete an energizing circuit for the advance motor AM. The direction of energization of the advance motor, as determined by the contacts U6 and U7, is correct for up travel of the elevator car.

At this stage a substantial part of the resistor R2 is shunted and the armature of the advance motor is energized through the circuit:

B1–*a*, 40–5, 7SU, 7SD, DPL4, UPL4, U6, AM, U7, B2

By reference to Figs. 2 and 3, it will be recalled that the advance motor AM rapidly moves the advance carriage 43A in an upward direction through the distance permitted by the lost-motion coupling between the advance and synchronous carriages.

As explained in the discussion of Figs. 2 and 3, the relative motion of the advance and synchronous carriages results in movement of the armature UMA away from the up solenoid coil UM.

As the advance carriages are moved by the advance motor relative to the synchronous carriages, the switch 1SU opens. By reference to Fig. 4, it will be noted that such opening prevents energization of the down switch D. Also, the switch 4SU opens to prevent energization of the coil 193.

As the advance carriages continue to move, the switch 3SU closes to permit energization of the up stop pawl relay UPL by a registered car call. However, for reasons which will be set forth below, such energization cannot take place until the advance carriage nears a floor for which the car call is registered.

Movement of the advance carriage results in movement of the armature UMA (Fig. 3) out of the associated solenoid coil UMC to provide minimum impedance of the solenoid. For present purposes, it will be assumed that the characteristics of the control system are such that suitable acceleration of the elevator car is obtained if the solenoid UM has minimum impedance.

During the movement of the advance carriages, the switch 11SU opens to deenergize the transfer relay TR. This occurs when the movement of the advance carriages is equivalent to twenty inches of car travel. In addition, the switch 7SU opens as the advance carriages near their fully advanced positions to introduce a substantial portion of the resistor R2 in circuit with the armature of the advance motor AM. This reduces heating of the advance motor, but sufficient torque is produced by the advance motor under these conditions to force the advance carriages to follow the synchronous carriage movements.

Upon dropout, the transfer relay closed its break contacts TR2 and TR3, and it opened the contacts TR4 and TR5 to place the coil PM1 and the relay BR through the contacts U1 and U2 under control of the solenoid UM. Also the break contacts TR1 closed to complete a holding circuit for the relay 32 and the up switch U which may be traced as follows:

B1, TR1, 40–2, U3, U, 1SD, 32, B2–*a*

Consequently, the car attendant now may release his up push button UPB. Such release deenergizes the door closing relay DC which closes its break contacts DC1 and DC2. The closure of these contacts has no immediate effect on system operation.

It will be assumed that the advance carriages now are fully advanced. From this point on, the advance carriages can advance only with the associated synchronous carriages.

If desired, the elevator system may be so designed that the elevator car starts to move before the advance carriages reach their fully advanced positions. However, in a preferred embodiment of the invention, the advance carriages are moved rapidly and reach their fully-advanced positions before the elevator car starts to move.

It will be recalled that the car running relay 32 was energized at the same time at which the up switch U was energized. As a result of its energization, the car running relay 32 closed its make contacts 32–1 to release the elevator car brake. Such release permits upward travel of the elevator car. The car running relay when energized also closed its make contacts 32–2 and 32–3 to prepare holding circuits for the pawl relays UPL and DPL for subsequent operation.

Inasmuch as the break contacts TR2 and TR3 are closed and the make contacts U1 and U2 are closed, the winding PM1 of the pattern motor PM and the relay BR are connected across the secondary winding of the transformer 259 through the rectifier 261 and the solenoid control unit UM. Since the solenoid control unit UM has its minimum impedance, maximum energization is applied to the winding PM1 of the pattern motor and the resultant torque applied to the lever 215 decreases materially the effective resistance of the rheostat 241. The decreased resistance of the rheostat 241 results in the flow of substantial current through the primary winding of the transformer 255 and the generator G consequently is excited for full speed operation in the up direction. The energization of the field windings is accompanied by the inducing of voltage in the winding 257 to energize the winding PM2 of the pattern motor PM. This develops a force acting in opposition to the force produced by energization of the winding PM1. However, the energization of the winding PM2 exists only while the energization of the field windings is changing. As previously explained, the purpose of the winding PM2 is to decrease hunting of the motor 1.

The motor 1 now accelerates to move the elevator car in the up direction. Such acceleration is accompanied by acceleration of the disc 231 which is electromagnetically coupled to the lever 215 through the magnet 237. As the speed of the motor increases the torque applied to the lever 215 by the disc 231 increases until a condition of equilibrium is reached at which the speed of the motor corresponds to the desired running speed of the elevator car 11. Any deviation of the elevator car from the desired speed results in a change in the torque applied to the lever 215 by the disc 231. This change is in the proper direction to restore the motor 1 to the desired speed.

As the elevator car moves, the car motion is transmitted through the transmitter or generator SG to the motor SM. This motor thereupon drives the synchronous carriages 43S and 45S (Fig. 2) in accordance with car movement. Since the advance carriages 43A and 45A now are biased by the advance motor AM in the direction of travel of the synchronous carriages, it follows that all of the carriages move as a unit.

As stated in the aforesaid Savage patent, one of the switches in the set 49A (Fig. 2) is employed for picking up car calls in either direction of travel of the elevator car. Thus, in Fig. 4, the switch 49A(1) is in the floor stop unit for the first floor, the switch 49A(2) is in the floor stop unit for the second floor, etc. However, the closure of one of these switches is effective for a control operation only if the associated car call push button is in operated condition.

As the advance carriage nears the fourth floor, it closes the switch 49A(4) for the fourth floor. This closure may take place when the advance carriage is short of the position which it occupies when the elevator car is at the fourth floor by a distance of the order of four feet measured in terms of car travel. If the advance carriage leads the elevator car by a distance equivalent to twenty feet of car travel, it follows that the switch 49A(4) is closed when the elevator car is approximately twenty-four feet from the fourth floor.

Upon closure of the switch 49A(4), the following circuit is completed:

B1–a, 4c, 49A(4), 40–4, 3SU, UPL, B2

Upon energization, the up pawl relay UPL closes its contacts represented by the switches 67 (Fig. 3). Each one of the switches will be identified by the reference character UPL followed by an appropriate suffix. As shown in Fig. 4, closure of the make contacts UPL1 completes a holding circuit for the up pawl relay through the make contacts 32–2. Opening of the break contacts UPL3 and UPL4 introduces substantial resistance in series with the advance motor AM shortly before the advance carriage is brought to a stop.

The energization of the up pawl relay UPL also projects the cam 105 (Fig. 3) into position for operating the set of switches 49 for the fourth floor. The expression "49(4)" designates the set for the fourth floor. One of these switches 49(4)–1 (Fig. 4) is closed by the cam to energize the canceling coil 4URN for the fourth floor in the event that a floor call is registered for the fourth floor. However, under the assumed condition, no floor call has been registered.

The cam also closes a switch 49(4)–2 for the purpose of energizing the up lantern 4LAU for the fourth floor.

In addition, the energization of the up pawl relay UPL projects the stop pawl 95 (Fig. 3) into position to engage a lug associated with a clamp of the floor stop unit associated with the fourth floor. (See the discussion of the lug 97 and the clamp 113 in the aforesaid Savage patent.) Consequently, as the advance carriage continues its upward travel, the pawl 95 engages the lug for the floor stop unit of the fourth floor to bring the advance carriages to a stop.

As the elevator car continues in the upward direction, the synchronous carriage 43S (Fig. 3) moves with respect to the advance carriage 43A to operate the switches 1SU and similar switches mounted on the advance carriage. As previously explained, these switches are operated in accordance with the development illustrated in Fig. 7.

The movement of the synchronous carriage 43S relative to the advanced carriage 43A also operates to move the armature UMA towards the coil UMC of the solenoid control unit UM. The movement of the armature is accompanied by a gradual increase in the impedance of the coil UMC and a gradual decrease in the energization of the winding PM1 of the pattern unit PM. The resultant reduction in the torque applied to the lever 215 by the pattern unit results in movement of the lever in a clockwise direction about its pivot 217 to increase the effective resistance of the rheostat 241. This decreases the current supplied to the primary winding of the transformer 255 and the excitation of the generator G. Since the excitation changes, a voltage is induced in the winding 257 which is in a proper direction for minimizing hunting of the motor 1. Furthermore, it should be noted that the cup 229 if made of electroconductive material acts to damp movement of the windings PM1 and PM2 with respect to the associated magnetic structure. Hunting of the system thus is minimized.

When the elevator car reaches a distance of the order of twenty inches from the fourth floor, the switches 11SU and 11SD close to complete an energizing circuit for the transfer relay TR. This relay opens its break contacts TR1 to interrupt the holding circuit for the up switch U and the car running relay 32. The transfer relay also opens its break contacts TR2 and TR3 to disconnect the solenoid control unit UM from the winding PM1 and the relay BR. Make contacts TR4 and TR5 close to connect the winding PM1 and the relay BR for energization under the control of the electromagnetic unit EU.

The deenergization of the up switch U is accompanied by opening of the make contacts U1, U2, U3, U4, U6 and U7 without immediate effect on the operation of the system. The drop out of the relay 32 is accompanied by the opening of the make contacts 32-1. However, the make contact BR1 of the auxiliary brake relay BR closes before the brake can drop out. Opening of the make contacts 32-2, 32-3, has no immediate effect on the operation of the system.

At the time the transfer is made, the electromagnetic unit EU is adjacent the lower end of the plate P which has a substantial shielding effect. Consequently, a larger current is provided by the rectifier 271 than by the rectifier 267 and the pattern motor has its winding PM1 energized with proper polarity to continue the upward motion of the elevator car at a slow rate of speed.

As the elevator car continues its upward motion, the current applied by the rectifier 271 decreases and the current supplied by the rectifier 267 increases to decrease the difference therebetween. This gradually reduces the energization of the winding PM1 and consequently reduces the speed of the elevator car. When the elevator car reaches a position in registry with the fourth floor the voltage applied to the winding PM1 is reduced to zero and the elevator car speed is zero. Consequently, the elevator car is at rest accurately at the desired floor. At this stage the voltage applied to the auxiliary relay BR also reduces to zero and the relay opens its make contacts BR1 to permit application of the brake 7. Should the elevator car be displaced from the fourth floor thereafter for any reason such as cable contraction or stretch the elevator car will be returned into registry with the floor by a sequence which will be understood from the foregoing discussion.

B. *Car moves from fourth floor to second floor*

Next, it will be assumed that the elevator car is positioned at the fourth floor during a down trip. The down pawl relay is assumed to have been energized to bring the car to a stop at the fourth floor. The down lantern is illuminated for the fourth floor. At this time, a person on the second floor operates the push button 2D for the second floor in order to register a floor call. By reference to Fig. 4A, it will be noted that operation of the push button 2D energizes the down floor call registering relay 2DR. This relay closes its contacts 2DR1 to establish a holding circuit for itself. In addition, the relay closes its make contacts 2DR2 to prepare for subsequent energization of the down pawl relay DPL.

The car attendant now operates the down push button DPB to energize the door closing relay DC. This initiates closure of the hoistway door for the fourth floor and the car gate. The door closing relay also opens its break contacts DC1 and DC2. In opening, the contacts DC2 deenergize the down pawl relay, and this relay thereupon opens contacts 53(4)-2 (corresponding to contacts 53(2)-2 for the second floor) to interrupt the illumination of the down lantern for the fourth floor. The opening of the contacts 53(4)-1 (corresponding to 53(2)-1 for the second floor) has no immediate effect. The down pawl relay DPL also opens contacts DPL1 but this has no immediate effect on the system. Break contacts DPL3 and DPL4 close to permit shunting of substantial parts of the resistor R2.

The closure of the door energizes the door relay 40. This relay closes its make contacts 40-1, 40-2, 40-4, and 40-5, but such closures have no immediate effect on the operation of the system. In addition, the relay opens its break contact 40-6 to deenergize the coil 193. By reference to Fig. 2, it will be recalled that deenergization of the coil 193 couples the sprocket wheel 33 to the motor SM in order to permit the motor to drive the synchronous carriages.

The operation of the down push button DPB by the elevator car attendant also completes the following circuit following closure of the contacts 40-3:

B1, DPB, 40-3, D, 1SU, 32, B2a

The resulting energization of the down switch D closes the contacts D1 and D2 to prepare the coil PM1 of the pattern motor PM for energization in the proper direction for down travel of the elevator car. Closure of the make contacts D3, D4 and D5 has no immediate effect on the operation of the system. The closure of the make contacts D6 and D7 completes an energizing circuit for the advance motor, the direction of energization being correct for down travel of the elevator car. Since the resistor R2 is shunted, the advance motor rapidly advances the associated advance carriages. As the advance carriages are moved relative to their associated synchronous carriages, the switch 1SD opens to prevent energization of the switch U. The switch 3SD closes to permit energization of the down pawl relay DPL when the elevator car is to answer a registered car call. The switch 4SD opens to prevent energization of the coil 193 during down travel of the elevator car. The switch 7SD opens to introduce resistance in series with the armature of the advance motor shortly before the advance carriages reach their maximum advance for the down direction. The switch 11SD opens to deenergize the transfer relay, which closes its contacts TR1, TR2 and TR3 and opens the contacts TR4 and TR5.

The car running relay 32 upon being energized, closes its contacts 32-1 to permit release of the elevator brake. Make contacts 32-2 and 32-3 close preparing a holding circuit for the down floor relay DPL for subsequent operation.

It will be recalled that the advance carriages reach their maximum advances in the downward direction prior to movement of the elevator car. The advance of the carriage is accompanied by movement of the armature DMA away from the coil DMC to reduce the impedance of the coil. Consequently, a substantial current is supplied to the coil PM1 of the pattern motor PM from the secondary winding of the transformer 259 through the low-impedance of the coil DMC, the rectifier 262, the make contacts D1 and D2 and break contacts TR2 and TR3. The relay BR also is energized and picked up. This current to the pattern motor is in proper polarity to produce downward motion of the elevator car and will be assumed to apply a torque to the lever 215 acting in a clockwise direction about the pivot 217. The resulting movement of the lever 215 operates the springs 239A to 239F to reduce the effective resistance of the rheostat 239. This permits substantial current to flow through the primary winding of the transformer 247 and the transformer supplies through the rectifier 253 a direct current to the field windings GF1 and GF2 of the generator G with proper polarity for down movement of the elevator car.

As the motor 1 accelerates, it rotates the disc 231 to apply through the magnet 237 a torque to the lever 215 which acts in opposition to the torque applied by the coil PM1. An equilibrium finally is reached when the elevator car operates at the desired speed. It will be recalled that the winding 257 and the cup 229, if of electroconductive material, cooperate to minimize hunting of the system.

As the elevator car moves in the down direction, the position generator or transmitter SG energizes the motor SM to drive the synchronous carriages in synchronism with movement of the elevator car. Since the advance carriages are maintained in their advanced positions they move in unison with the synchronous carriages during full speed travel of the elevator car in the down direction.

Registered down floor calls are picked up by one of the switches in each of the sets 55A in the manner described in the aforesaid Savage patent. As the advance carriage 45A approaches each of the associated floor stop units in succession, it operates successively the sets of switches 55A. When the advance carriage reaches a predetermined point, such as a position which may be four feet (measured in terms of car travel), before the second floor, it closes the switch 55A2–1. This is one of the switches of the set 55A associated with the floor stop unit for the second floor. Since the advance carriage may lead the elevator car by a distance such as twenty feet (measured in terms of car travel), it follows that the switch 55A2–1 is closed when the elevator car is about twenty-four feet from the second floor.

Upon closure of the switch 55A2–1, the down pawl relay is energized through the following circuit:

B1–a, 55A2–1, 2DR2, D4, DPL, B2

The down pawl relay operates its contacts. The individual switches of the set are identified by the reference character DPL followed by an appropriate suffix. Thus, the make contacts DPL1 close to establish through the make contacts 32–3 a holding circuit for the down pawl relay DPL. In addition, the break contacts DPL3 and DPL4 open to insert additional resistance in series with the advance motor shortly before the advance carriages are brought to a stop.

By reference to the aforesaid Savage patent, it will be recalled that the down pawl relay upon energization operates the set of switches 53 for the second floor. By reference to Fig. 4A, it will be observed that the set 53 for the second floor includes a switch 53(2)–1 which is closed to energize the canceling coil 2DRN. Such energization cancels the call registered for the second floor. In addition, a second switch of the set 53(2)–2 closes to energize the down floor lantern 2LAD.

The energization of the down pawl relay DPL also operates to bring the advance carriages to a stop when the elevator car is approximately twenty feet from the second floor as described in the aforesaid Savage patent.

Continued movement of the elevator car results in motion of the synchronous carriages relative to the advance carriages. It will be recalled that such relative motion operates a plurality of switches mounted on the advance carriage 45A.

The relative motion of the carriages also moves the armature DMA towards the coil DMC to increase the impedance of the coil in a gradual manner. The increase in impedance of the coil results in a gradual decrease in current supplied to the winding PM1 of the pattern motor PM. The resultant movement of the lever 215 increases the effective resistance of the rheostat 239 and consequently reduces the excitation of the generator G. Consequently, the elevator car is gradually slowed as it approaches the second floor.

When the elevator car reaches a distance of the order of twenty inches from the second floor the switches 11SD and 11SU close to energize the transfer relay TR. This relay opens its break contacts TR1 to interrupt the holding circuit for the down switch D and the car running relay 32. In addition, the break contacts TR2 and TR3 open to interrupt the energization of the winding DM1 through the coil DMC. Closure of make contacts TR4 and TR5 connects the winding PM1 and the auxiliary break relay BR for energization under the control of the electromagnetic unit EU.

The down switch D in dropping out opens its make contacts D1, D2, D3, D4, D6 and D7 without immediately affecting the operation of the system. The relay 32 in dropping out opens its make contacts 32–1, but the closure of the contacts BR1 of the auxiliary brake relay prevents application of the brake. Opening of the make contacts 32–2 and 32–3 has no immediate effect on the operation of the system.

When the transfer occurs the electromagnetic unit EU is adjacent the upper end of the plate P for the second floor. In this position of the elevator car, the plate has little shielding action on the electromagnetic unit. Consequently, the rectifier 267 supplies a substantial current whereas the rectifier 271 supplies a smaller current to the resistor 273. The resultant voltage across the resistor energizes the winding PM1 of the pattern motor PM with proper polarity for continued down travel of the elevator car 11. As the elevator car continues its approach to the second floor, the plate P applies an increasing shielding action and the voltage P applied to the winding PM1 consequently decreases gradually. This means that the speed of the elevator car is also gradually decreased until the elevator car reaches registry with the second floor. At this point, the voltage across the resistor 273 is reduced to zero and the speed of the elevator car is also reduced to zero. The brake auxiliary relay BR drops out to permit application of the brake 7. The elevator car is retained accurately in registry with the second floor. Should the elevator car be displaced from the second floor for any reason such as cable contraction or stretch the electromagnetic unit would initiate a return of the elevator car into registry with the second floor as will be understood from the foregoing discussion.

During the final movement of the elevator car, the switch 4SD closed (such closure may be when the elevator car is two feet from the second floor). Such closure prepares the coil 193 for subsequent energization. In addition, the switch 1SD closes when the elevator car is within one foot of the second floor to prepare the up switch U for subsequent energization.

The elevator car attendant now opens his car gate and the hoistway door for the second floor to receive the waiting passenger. Such openings result in deenergization of the door relay 40. Opening of the make contacts 40–1, 40–2, 40–3, 40–4 and 40–5 has no immediate effect on the system operation. However, the closure of the break contacts 40–6 completes an energizing circuit for the coil 193. This coil upon being energized releases the sprocket wheel 33 (Fig. 2) and permits registration of the advance and synchronous carriages.

When the passenger has entered the elevator car, the car attendant proceeds to the lower terminal floor by a sequence of operations which will be clear from the preceding discussion.

It should be noted that when the elevator car makes a short run, such as a run from the second to the first floor, the advance carriages may be brought to a stop before they reach their full advance. For example, let it be assumed that the elevator car attendant operates the car push button 1c for the first floor. Following operation of the down push button DPB, the advance carriages start to advance in the manner previously described. However, if the first and second floors are separated by less than twenty feet, the advance carriages do not reach their full advance before the switch 49A1 associated with the floor stop unit for the first floor is closed. The closure of the switch 49A1 completes an energizing circuit for the down pawl relay DPL, and this relay operates in the manner previously described to bring the advance carriages to a stop.

If the first and second floors are spaced by say fifteen feet, the armature BMA is not completely withdrawn from the coil BMC and the coil will not have its minimum impedance. Consequently, the elevator car will not accelerate as rapidly for the short run as it does for a long run. With this exception, it will be appreciated that the system operates for the short run in a manner analogous to the operation of the system for a longer run. Since the electromagnetic unit EU operates for a very limited travel of the elevator car, it is clear that it is always employed for controlling the elevator car whether the elevator car is operated on a run from one floor to the next floor or on a longer run. Consequently, it is always available for establishing an accurate slow-down pattern for the elevator car as it nears a floor at which the car is to stop.

The system herein illustrated and described also is effective for leveling the elevator car should it have failed to stop accurately at the desired floor.

Let it be assumed that because of cable stretch the elevator car drops from registration with a desired floor. In response to such drop the electromagnetic unit EU applies through the rectifiers 267 and 271 to the resistor 273 a voltage sufficient to pick up the auxiliary brake relay BR and to energize the winding PM1 of the pattern motor PM with proper polarity for up travel of the elevator car. The auxiliary brake relay BR closes its make contacts BR1 to release the brake and the elevator car moves into accurate registration with the floor by a sequence which will be clear from the foregoing discussion.

FIGURES 8 AND 9

Figure 8:
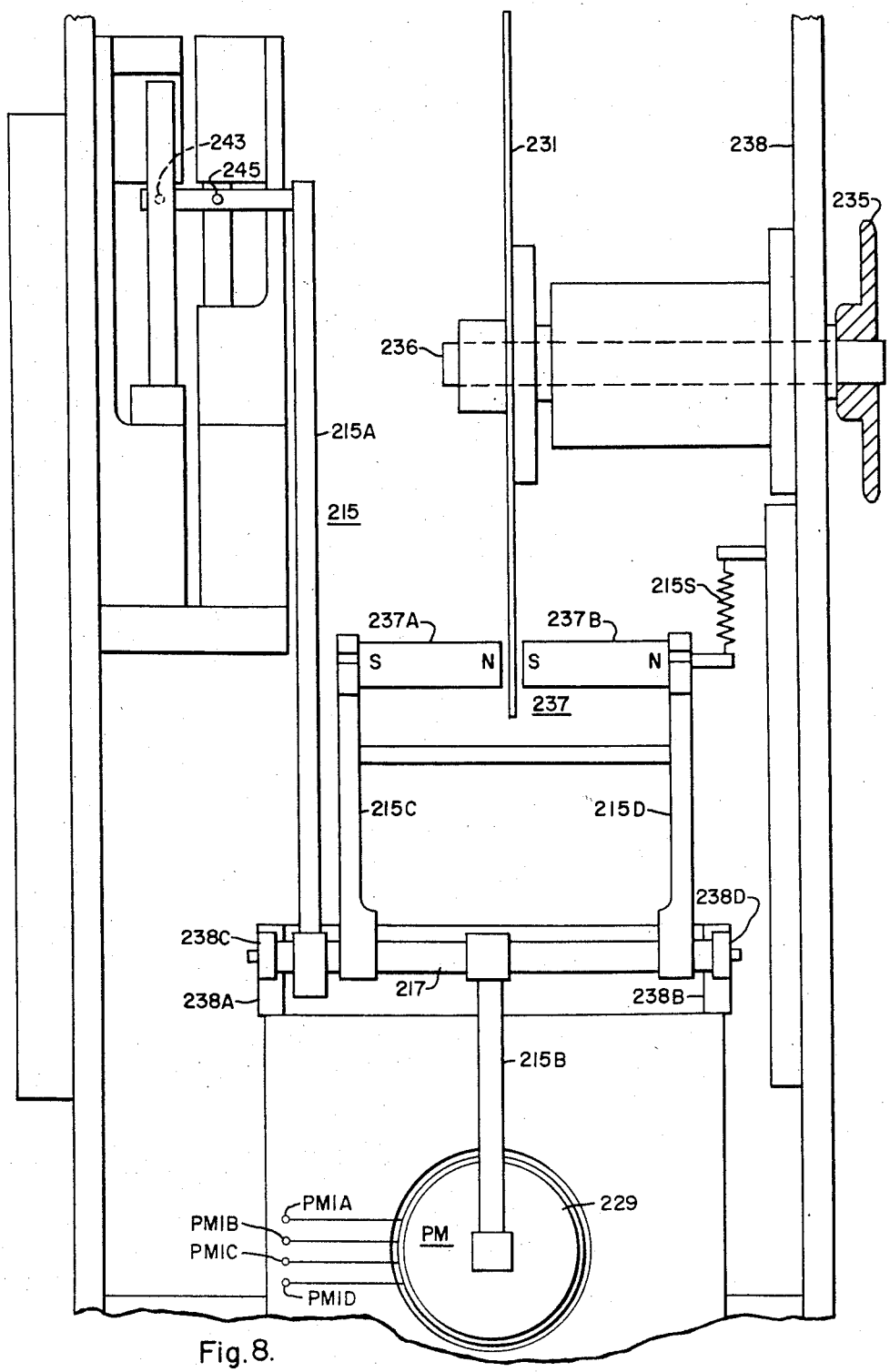
Fig. 8 is a view in side elevation of a control unit suitable for the system of Fig. 1.
Figure 9:
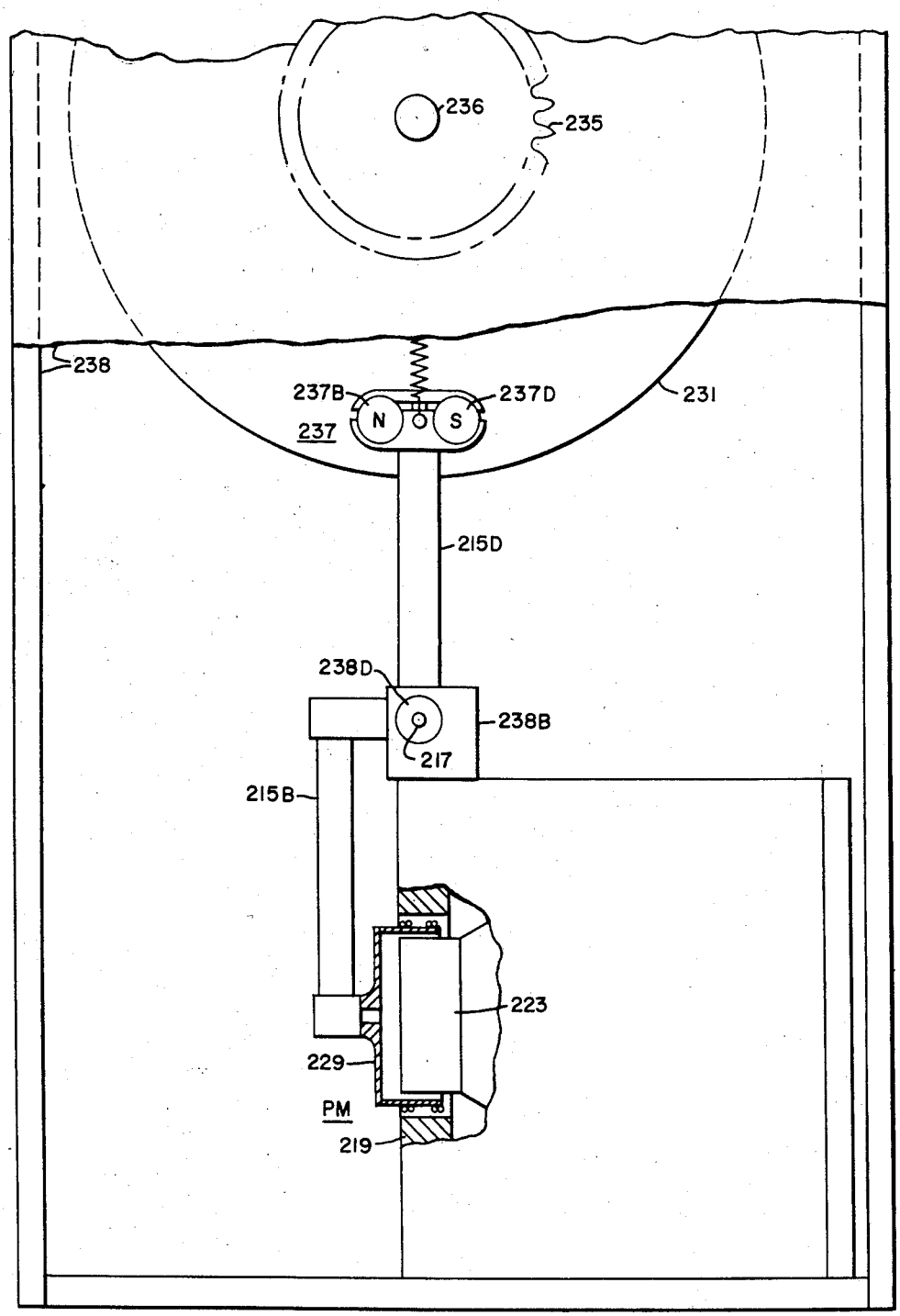
Fig. 9 is a view in front elevation and the control unit illustrated in Fig. 8.

Referring to Figs. 8 and 9, it will be observed that the disc 231 and the sprocket wheel 235 are mounted on a common shaft 236 for rotation with respect to a supporting structure 238. The lever 215 also is mounted for rotation with respect to the supporting structure 238 by means of the pin 217. This pin is received in two ears 238A and 238B of the supporting structure and preferably is mounted for rotation with respect to the supporting structure by anti-friction bearings 238C and 238D.

The lever 215 additionally includes an arm 215A which carries the pins 243 and 245 for actuating the rheostats 239 and 241. The lever includes an additional arm 215B which is secured to the cup 229 of the pattern motor PM.

For establishing a magnetic field for the disc 231 the lever 215 includes two arms 215C and 215D which may be constructed of a soft magnetic material such as iron. These arms carry a permanent magnetic assembly for establishing the desired magnetic field. Thus, a permanent magnet 237A has one end secured to the arm 215C whereas a second permanent magnet 237B has an end secured to the arm 215D. Pole faces of the permanent magnets are spaced to define an air gap within which the disc 231 is located. Polarities for the permanent magnets are indicated by the reference character N for north pole and the reference character S for south pole. In order to reduce inertia as much as possible the permanent magnets are preferably constructed of a high-coercive high-energy-product material such as an aluminum-nickel-iron-copper-cobalt alloy known as Alnico. If only two permanent magnets are employed the pin 217 may be constructed of a soft magnetic material such as iron to complete a return path for magnetic flux.

In a preferred embodiment of the invention, four permanent magnets are employed. Thus, in addition to the permanent magnets 237A and 237B, two additional magnets 237C and 237D are connected respectively to the arms 215C and 215D. These arms can now be made of light-weight non-magnetic material such as aluminum. Suitable polarities for the permanent magnets are illustrated in Fig. 9. Such a construction assures the production of an intense magnetic field with small permanent magnets and further reduces the inertia of the assembly.

If desired, electromagnets may be employed in place of the permanent magnets. Fig. 10 illustrates a construction employing such electromagnets. In the construction of Fig. 10, the permanent magnets of Figs. 8 and 9 are replaced by two soft magnetic pole pieces 237E and 237F which may be constructed of iron. These pole pieces are secured respectively to the arms 215C and 215D to establish an air gap for the disc 231.

The pole piece 237E is surrounded by a winding 237G which is secured to the supporting structure 238. In a similar manner the pole piece 237F is surrounded by a winding 237H. These windings are connected in series and are energized by direct current to establish magnetomotive forces acting in the same direction along the axis of the pole pieces. For this modification, the pivot 217 may be constructed of a soft magnetic material to complete a magnetic return path for the pole piece.

By inspection of Fig. 10 it will be noted that the pole pieces 237E and 237F are spaced from the windings 237G and 237H. This permits the pole pieces to move with the lever 215 without requiring movement of the windings and materially reduces the inertia of the movable assembly.

The springs of the rheostats 239 and 241 tend to bias the lever 215 towards a predetermined centered position. If required, further biasing may be provided by a spring 215S (Fig. 8) which is connected between the lever and a part of the supporting structure 238. However, in a preferred embodiment the spring 215S is employed to toggle out or compensate for the forces exerted on the lever 215 by the leaf springs of the rheostats 239 and 241. To this end, the spring 215S is a compression spring. When the lever 215 is displaced in either direction from its centered position the spring 215S urges the lever in the same direction to oppose the centering torque of the rheostats on the lever. In practice, it has been found adequate to compensate in this manner for approximately 50% of the torque exerted on the lever by the rheostats.

The windings of the pattern motor PM may be brought out to suitable terminals PM1A, PM1B, PM1C and PM1D which are mounted on the supporting structure 238 and which are suitably insulated from each other.

The electroconductive armature represented by the disc 231 may be mounted for rotation directly with the motor 1. Thus, in the embodiment of Fig. 11, the armature is in the form of a hollow electroconductive cylinder 301 which is secured directly to the sheave 5. The armature may be constructed of a suitable electroconductive material such as aluminum or copper.

A lever 303 is mounted adjacent the armature 301 for rotational movement about an axis represented by a pin 305 which extends transversely to the axis of the armature 301. The lever 303 carries a C-shaped permanent magnet 307 having pole faces spaced to define an air gap within which a portion of the armature or cylinder 301 is located. Rotation of the armature 301 applies a force to the lever 303. This force is opposed by the pattern motor PM which has its cup 229 secured to the lever 303. The lever 303 also carries pins 243 and 245 for operating the rheostats 239 and 241 or other forms of transducers. The connections of the pattern motor PM and of the rheostats 239 and 241 are similar to those illustrated in Fig. 4.

Although the invention has been described with reference to certain specific embodiments thereof, numerous modifications falling within the spirit and scope of the invention are possible.

I claim as my invention:

1. In an elevator system, an elevator car, means including a motor having a rotatable rotor for moving the elevator car, and speed-control means controlling the speed of the elevator car, said speed-control means comprising a control element, support means, means mounting the control element on the support means for movement in a first direction relative to the support means, electromagnetic-coupling means for electromagnetically coupling the control element to the motor for applying a first force acting on the control element about said axis, said force having a magnitude dependent on the rate of rotation of the rotor of said motor, means for applying a second predetermined force to said control element acting in opposition to said first force, means for energizing said motor to produce rotation of the rotor, and means responsive to movement of the control element relative to the support means for modifying the energization of said motor.

2. In an elevator system, an elevator car, means including a motor having a rotatable rotor for moving the elevator car, and speed-control means controlling the speed of the elevator car, said speed-control means comprising a control element, support means, means mounting the control element on the support means for movement in a first direction relative to the support means, electromagnetic-coupling means for electromagnetically coupling the control element to the motor for applying a first force acting on the control element about said axis, said force having a magnitude dependent on the rate of rotation of the rotor of said motor, means for applying a second predetermined force to said control element acting in opposition to said first force, means for energizing said motor to produce rotation of the rotor, and means responsive to movement of the control element relative to the support means for modifying the energization of said motor, and feedback means responsive to a rate of change in energization of the motor for applying a force acting on the control element.

3. In an elevator system, an elevator car, means including a motor having a rotatable rotor for moving the elevator car, and speed-control means controlling the speed of the elevator car, said speed-control means comprising a control element, support means, means mounting the control element on the support means for movement in a first direction relative to the support means, electromagnetic-coupling means for electromagnetically coupling the control element to the motor for applying a first force acting on the control element about said axis, said force having a magnitude dependent on the rate of rotation of the rotor of said motor, means for applying a second predetermined force to said control element acting in opposition to said first force, means for energizing said motor to produce rotation of the rotor, and means responsive to movement of the control element relative to the support means for modifying the energization of said motor, and feedback means responsive to a rate of change in energization of the motor for applying a force acting on the control element, said feedback force acting on the control element in a direction acting to modify the energization of the motor in a direction opposing said change in speed of the elevator car.

4. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, impedance means adjustable for varying the field excitation of the generator from said source, excitation motor means effective when energized for adjusting the impedance means to vary the field excitation of the generator, and means electromagnetically coupling the excitation motor means to the armature of the direct-current motor for applying to the excitation motor means a force acting in opposition to the excitation motor means, whereby the impedance means is adjusted in dependence on the difference in the outputs of the excitation motor means and the electromagnetic coupling means.

5. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, impedance means adjustable for varying the field excitation of the generator from said source, excitation motor means effective when energized for adjusting the impedance means to vary the field excitation of the generator, and means electromagnetically coupling the excitation motor means to the armature of the direct-current motor for applying to the excitation motor means a force acting in opposition to the output of the excitation motor means, whereby the impedance means is adjusted in dependence on the difference in the outputs of the excitation motor means and the electromagnetic coupling means, said coupling means comprising an electroconductive device, a magnet device for producing a magnetic field, means mounting the device for rotation relative to each other about an axis with a portion of the electroconductive device disposed in said magnetic field, means coupling a first one of the devices to the armatures of the direct-current motor for rotating such device about said axis in accordance with rotation of the direct-current motor, and means coupling a second one of said devices to the excitation motor means to bias said excitation motor means in accordance with rotation of the armature of the direct-current motor means.

6. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, excitation motor means responsive to energization of a first polarity for developing a first motor force acting in a first direction, said excitation motor means being responsive to energization of a second polarity for developing a second motor force acting in a second direction, an energy source, adjustable impedance means responsive to actuation by said first motor force for energizing the field excitation means of the generator to produce field excitation of a first polarity, said adjustable impedance means being responsive to actuation by the second motor force for energizing the field excitation means of the generator to produce field excitation of a second polarity, and means electromagnetically coupling the excitation motor means to the armature of the direct-current motor to develop a force dependent on the direction and rate of rotation of the armature of the direct current motor and acting in opposition to the force produced by the excitation motor means.

7. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, excitation motor means responsive to energization of a first polarity for developing a first motor force acting in a first direction, said excitation motor means being responsive to energization of a second polarity for developing a second motor force acting in a second direction, an energy source, adjustable impedance means responsive to actuation by said first motor force for energizing the field excitation means of the generator to produce field excitation of a first polarity, said adjustable impedance means being responsive to actuation by the second motor force for energizing the field excitation means of the generator to produce field excitation of a second polarity, and means electromagnetically coupling the excitation motor means to the armature of the direct-current motor to develop a force dependent on the direction and rate of rotation of the armature of the direct current motor and acting in opposition to the force produced by the excitation motor means, and means for applying to said excitation means a force dependent on the rate of change of energy supplied by the direct-current generator to the direct-current motor and acting on the impedance means to oppose any change in energization of the direct-current motor by the direct-current generator.

8. In a motor control system, an electric motor having a stator and a rotor, speed control means for said motor comprising a structure, a control element mounted for movement relative to the structure, means for applying a first force representative of the desired speed of the motor, and acting between the structure and the control element in the direction of said movement, means electromagnetically coupling the control element to said rotor for applying to said control element in opposition to said first force a second force representative of the rate of rotation of the rotor, and energizing means responsive to movement of the control element relative to the structure for energizing the motor to a value establishing a predetermined relationship between said forces.

9. In a motor control system, an electric motor having a stator and a rotor, speed control means for said motor comprising a structure, a control element mounted for movement relative to the structure, means for applying a first force representative of the desired speed of the motor, and acting between the structure and the control element in the direction of said movement, coupling means electromagnetically coupling the control element to said rotor for applying to said control element in opposition to said first force a second force representative of the rate of rotation of the rotor, and energizing means responsive to movement of the control element relative to the structure for energizing the motor to a value establishing a predetermined relationship between said forces, said coupling means comprising an electroconductive member, a magnetic structure for developing a continuous magnetic field within which the electroconductive member is positioned, means coupling a first one of said members to said rotor for rotation about an axis relative to the structure in accordance with the rotation of the rotor, and means coupling a second one of the members to the control element for applying said second force to the control element.

10. In a motor control system, an electric motor having a stator and a rotor, speed control means for said motor comprising a structure, a control element mounted for movement relative to the structure, means for applying a first force representative of the desired speed of the motor, and acting between the structure and the control element in the direction of said movement, means electromagnetically coupling the control element to said rotor for applying to said control element in opposition to said first force a second force representative of the rate of rotation of the rotor, and means for applying between the control element and the structure in opposition to the first force a third force which is dependent on the rate of change of energization of the motor.

11. In a motor control system, a first electric motor having a stator and a rotor, speed control means for said motor comprising a structure, a control element mounted for movement relative to the structure, a second electric motor having a first energizing circuit effective when energized for applying a first force representative of the desired speed of the first motor and acting between the structure and the control element in the direction of said movement, means electromagnetically coupling the control element to said rotor for applying to said control element in opposition to said first force a second force representative of the rate of rotation of the rotor, said last-named means comprising an electroconductive member, a magnetic structure for developing a continuous magnetic field within which the electroconductive member is positioned, means coupling a first one of said members to said rotor for rotation about an axis relative to the structure in accordance with the rotation of the rotor, means coupling a second one of the members to the control element for applying said second force to the control element, a second energizing circuit for the second motor effective when energized for applying between the control element and the structure in opposition to any change in the first force or third force, the second energizing circuit being connected for energization in accordance with the rate of change in energization of the first motor, and energizing means responsive to movement of the control element relative to the structure for energizing the motor to a value establishing a predetermined relationship between the first and second forces.

12. In an elevator system, for a structure having landings, an elevator car, means including a motor having a rotatable rotor for moving the elevator car to serve said landings, and speed-control means controlling the speed of the elevator car, said speed-control means comprising a control element, support means, means mounting the control element on the support means for movement in a first direction relative to the support means, electromagnetic coupling means for electromagnetically coupling the control element to the motor for applying a first force acting on the control element about said axis, said force having a magnitude dependent on the rate of rotation of the rotor of said motor, means for applying a second predetermined force to said control element acting in opposition to said first force, means responsive to arrival of the elevator car at a predetermined distance from a landing at which the car is to stop for continuously decreasing the second force during substantial continued movement of the elevator car towards such landing for the purpose of decreasing the speed of the elevator car, means for energizing said motor to produce rotation of the rotor and means responsive to movement of the control element relative to the support means for modifying the energization of said motor.

13. In an elevator system, an elevator car, means including a motor having a rotatable motor for moving the elevator car, and speed-control means controlling the speed of the elevator car, said speed-control means comprising a control element, support means, means mounting the control element on the support means for movement in a first direction relative to the support means, electromagnetic-coupling means for electromagnetically coupling the control element to the motor for applying a first force acting on the control element about said axis, said force having a magnitude dependent on the rate of rotation of the rotor of said motor, means for applying a second predetermined force to said control element acting in opposition to said first force, said last-named means comprising a second electric motor effective when energized for developing said second force, means for energizing said second electric motor in accordance with a desired running speed of the elevator car, and means responsive to a predetermined condition for continuously reducing the energization of the second motor as a function of elevator car travel for a substantial distance of such travel, means for energizing said motor to produce rotation of the rotor, and means responsive to movement of the control element relative to the support means for modifying the energization of said motor, and feedback means responsive to a change in energization of the motor for applying a force acting on the control element, said feedback force acting on the control element in a direction acting to modify the energization of the motor in a direction opposing said change in speed of the elevator car.

14. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, impedance means adjustable for varying the field excitation of the generator from said source, excitation motor means effective when energized for adjusting the impedance means to vary the field excitation of the generator, and means electromagnetically coupling the excitation motor means to the armature of the direct-current motor for applying to the excitation motor means a force acting in opposition to the excitation motor means, whereby the impedance means is adjusted in dependence on the difference in the outputs of the excitation means and the magnetic coupling means, means for energizing the excitation motor means to produce a predetermined running speed of the elevator car, and means responsive to the arrival of the elevator car at a predetermined distance in advance of a landing at which the car is to stop for continuously decreasing the energization of the excitation motor means as a function of car travel for the purpose of slowing the elevator car, said electromagnetic coupling means comprising an electroconductive device, a magnet device for producing a magnetic field, means mounting the device for rotation relative to each other about an axis with a portion of the electroconductive device disposed in said magnetic field, means coupling a first one of the devices to the armatures of the direct-current motor for rotating such device about said axis in accordance with rotation of the direct-current motor, and means coupling a second one of said devices to the excitation motor means to bias said excitation motor means in accordance with rotation of the armature of the direct-current motor means.

15. In an elevator system for a structure, an elevator car, means including a motor for moving the elevator car relative to the structure through a predetermined path, and control means for controlling the speed and position of the elevator car, said control means comprising a floor selector having a support, a synchronous member coupled to the elevator car for movement relative to the support in synchronism with movement of the elevator car relative to the structure but at a rate substantially less than the rate of movement of the elevator car, and an advance member mounted for movement with the synchronous member relative to the support, said members having a coupling permitting relative movement therebetween, means effective when the elevator car is set for movement in a first direction for moving the advance member relative to the synchronous member through a limited travel and thereafter moving the advance member in unison with the synchronous member, means responsive to movement of the elevator car relative to the structure in the first direction past a preselected position for resetting the advance member relative to the synchronous member, a control device, a winding device having an electrical characteristic which varies continuously in accordance with continuous movement of the control device relative to the winding device through a predetermined path, means coupling one of said devices to the synchronous member and the other of said devices to the advance member for relative movement through the predetermined path in accordance with relative movement of the members, and means coupled to said winding device for response to said electrical characteristic for modifying the speed of the motor.

16. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, excitation motor means responsive to energization of a first polarity for developing a first motor force acting in a first direction, said excitation motor means being responsive to energization of a second polarity for developing a second motor force acting in a second direction, an energy source, adjustable impedance means responsive to actuation by said first motor force for energizing the field excitation means of the generator to produce field excitation of a first polarity, said adjustable impedance means being responsive to actuation by the second motor force for energizing the field excitation means of the generator to produce field excitation of a second polarity, a first pair of relatively movable energy-controlling devices coupled to the elevator car for reproducing on a reduced scale the motion of the elevator car relative to the structure as the elevator car approaches a landing at which it is to stop, a second device mounted on the elevator car, a separate third device for each of the landings mounted in the structure adjacent to the second device when the elevator car is near the associated landing, means controlled by the first pair of devices for continuously decreasing said energization of the excitation motor means in response to relative movement of the first pair of movable devices as the elevator car approaches a landing at which it is to stop, and means controlled by the second and third devices for applying to the excitation motor means in response to relative displacement of the second and third devices from positions corresponding to registration of the elevator car with a landing, a polarity of said energization selected to actuate movement of the elevator car into registration with such landing, and means electromagnetically coupling the excitation motor means to the armature of the direct-current motor to develop a force dependent on the direction and rate of rotation of the armature of the direct current motor and acting in opposition to the force produced by the excitation motor means, and means for applying to said excitation motor means a force dependent on the rate of change energy supplied by the direct-current generator to the direct-current motor and acting on the impedance means to oppose any change in energization of the direct-current motor by the direct-current generator.

17. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having field excitation means and having armatures connected in a loop circuit, whereby the motor is energized in accordance with the output of the generator, a source of field excitation for the generator, excitation motor means responsive to energization of a first polarity for developing a first motor force acting in a first direction, said excitation motor means being responsive to energization of a second polarity for developing a second motor force acting in a second direction, an energy source, adjustable impedance means responsive to actuation by said first motor force for energizing the field excitation means of the generator to produce field excitation of a first polarity, said adjustable impedance means being responsive to actuation by the second motor force for energizing the field excitation means of the generator to produce field excitation of a second polarity, first winding means, a first magnetic device, said winding means having an inductance which varies continuously as the magnetic device moves relative to the winding through a predetermined path, means mounting the magnetic device for movement through said predetermined path in accordance with a fraction substantially less than one of the movement of the elevator car as it approaches a landing at which the car is to stop, whereby the inductance of the winding means continuously changes as the elevator car approaches a landing at which the car is to stop, second winding means mounted on the elevator car, a separate second magnetic device for each of the landings mounted on the structure adjacent the second winding means when the elevator car is adjacent the associated landing, said second winding means having an output which varies in polarity dependent on the direction of displacement of the elevator car from a landing at which the car is stopped, and means responsive to the approach of the elevator car as it approaches a landing at which the car is to stop for controlling the energization of the excitation motor means initially by the inductance of said first winding means and finally by the output of said second winding means, and means electromagnetically coupling the excitation motor means to the armature of the direct-current motor to develop a force dependent as the direction and rate of rotation of the armature of the direct current motor and acting in opposition to the force produced by the excitation motor means, and means for applying to said excitation motor means a force dependent on the rate of change energy supplied by the direct-current generator to the direct-current motor and acting on the impedance means to oppose any change in energization of the direct-current motor by the direct-current generator.

18. In a control unit for a moving body, a magnetic assembly comprising a magnetic plate, a magnetic structure establishing a first magnetic path having an airgap adjacent the magnetic plate, means mounting the magnetic structure for movement relative to the magnetic plate, said magnetic plate and the magnetic structure being configured to provide a magnetic reluctance for the resultant magnetic path comprising the first magnetic path and the magnetic plate which increases as the magnetic structure moves in a first direction relative to the magnetic plate, means effective when energized for directing alternating magnetic flux through the resultant magnetic path, first and second winding means coupled to the resultant magnetic path for having voltages induced in the winding means by the magnetic flux, a first alternating voltage source, rectifier means connecting the source in series aiding with said first winding means to provide a first resultant direct output, a second alternating voltage source, rectifier means connecting the second source in series opposition with the second winding means to provide a second resultant direct output, and polarity-responsive control means responsive to the difference between said direct outputs.

19. In a control unit for a moving body, a supporting structure, a control element, means mounting the control element for movement relative to the supporting structure, a mechanical input device mounted for movement relative to the structure, means magnetically coupling the input device to the control element for applying a first force between the control element and the structure acting to urge the control element in one direction of movement, the force having a magnitude dependent on the rate of movement of the input device, and motor means effective when energized for applying between the supporting structure and the control element a second force acting in opposition to the first force, said second force having a magnitude dependent on the energization of the motor means.

20. In a control unit for a moving body, a supporting structure, a control element, means mounting the control element for movement relative to the supporting structure, a mechanical input device mounted for movement relative to the structure, means magnetically coupling the input device to the control element for applying a first force between the control element and the structure acting to urge the control element in a direction of movement dependent on the direction of movement of the input device, the force having a magnitude dependent on the rate of movement of the input device, and motor means effective when energized for applying between the supporting structure and the control element a second force acting in opposition to the first force, said second force having a magnitude dependent on the energization of the motor means, first adjustable electric impedance means having a predetermined response to movement of the control element in a first direction from a median position, and second adjustable electric impedance means having said predetermined response to movement of the control element in a second direction from said median position.

21. In a control unit for a moving body, a supporting structure, a control element, means mounting the control element for movement relative to the supporting structure, a mechanical input device mounted for movement relative to the structure, means magnetically coupling the input device to the control element for applying a first force between the control element and the structure acting to urge the control element in one direction of movement, the force having a magnitude dependent on the rate of movement of the input device, and motor means effective when energized for applying between the supporting structure and the control element a second force acting in opposition to the first force, said second force having a magnitude dependent on the energization of the motor means, said motor means comprising a magnetic structure having an airgap mounted on the supporting structure, said magnetic structure including means for establishing a constant magnetic field in said airgap, electroconductive support mounted in the airgap for movement in accordance with movement of the control element to develop eddy-current damping forces, and winding means secured to said electroconductive support effective when energized for applying a force between said control elements and the supporting structure.

22. In a control unit for a moving body, a supporting structure, a control element, means mounting the control element for pivoted movement about a first axis relative to the supporting structure, an electroconductive member, means mounting the electroconductive member for rotation about an axis, magnet means for establishing a magnetic field within which a portion of the electroconductive member is positioned, said magnet means being coupled to said control element for applying a first torque to the control element acting about the axis of the control element in response to rotation of the electroconductive member, and electromotive means effective when energized for applying to the control element a torque opposed to said first torque.

23. In a control unit for a moving body, a supporting structure, a control element, means mounting the control element for pivoted movement about a first axis relative to the supporting structure, an electroconductive member, means mounting the electroconductive member for rotation about an axis, magnet means for establishing a magnetic field within which a portion of the electroconductive member is positioned, said magnet means being coupled to said control element for applying a first torque to the control element acting about the axis of the control element in response to rotation of the electroconductive member, and electromotive means effective when energized for applying to the control element a torque opposed to said first torque, said electromotive means comprising a magnetic structure having a first pole piece having a cylindrical opening and a second pole piece within the opening and concentric therewith to define an airgap mounted on the supporting structure, said magnetic structure including means for establishing a magnetomotive force between the pole pieces to establish a magnetic field in the airgap, a cylindrical electroconductive support disposed concentrically in the airgap, and a winding on the support and concentric therewith, said cylindrical support being coupled to the control element for movement therewith, said winding being effective when energized for applying a torque to the control element acting about the control element axis, first and second adjustable rheostats, means responsive to deflection in a first direction of the control element from a median position for effecting a predetermined adjustment of the first rheostat, and means responsive to deflection in a second direction of the control element from a median position for effecting an adjustment of the second rheostat similar to said predetermined adjustment.

No references cited.